March 26, 1935.  W. FERRIS ET AL  1,995,638
MILLING MACHINE
Filed June 18, 1926  12 Sheets-Sheet 1
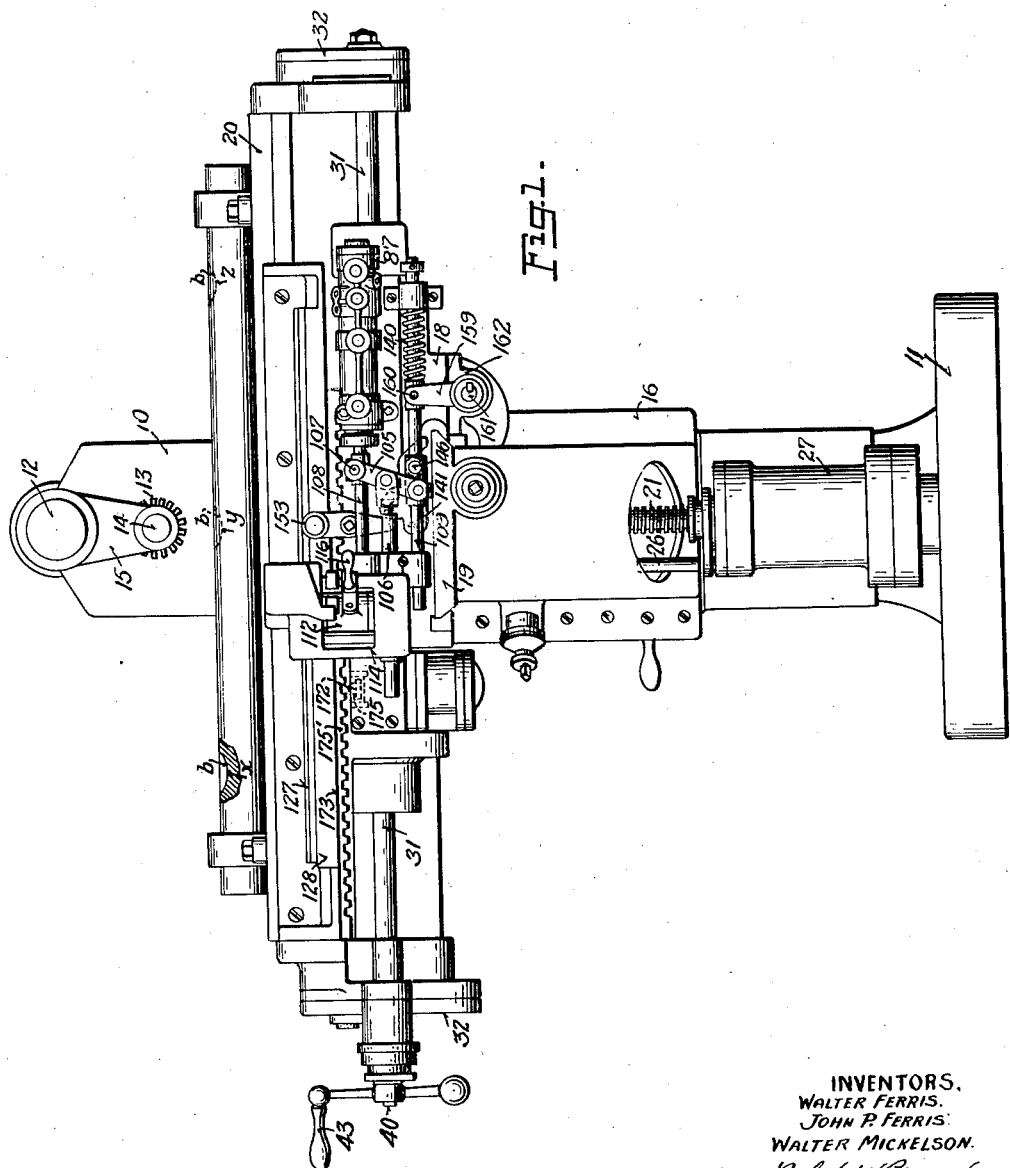
INVENTORS.
WALTER FERRIS.
JOHN P. FERRIS.
WALTER MICKELSON.
Ralph W. Brown
ATTORNEY.

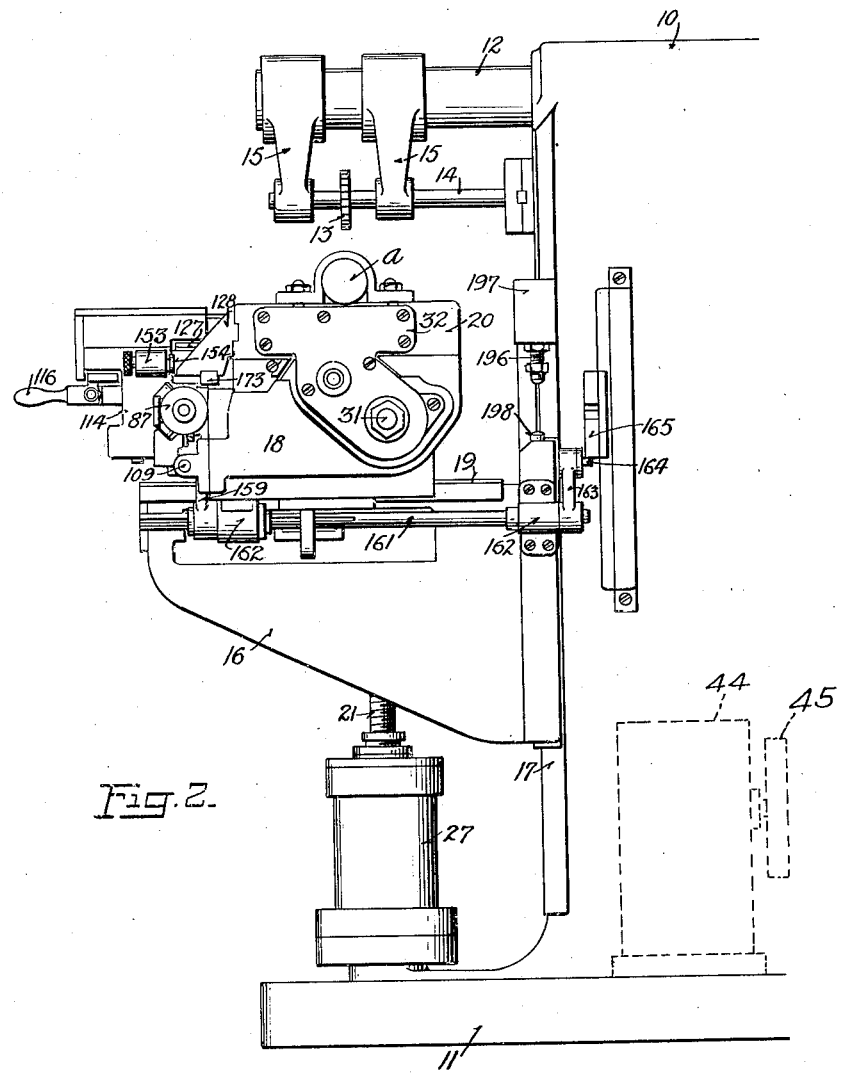

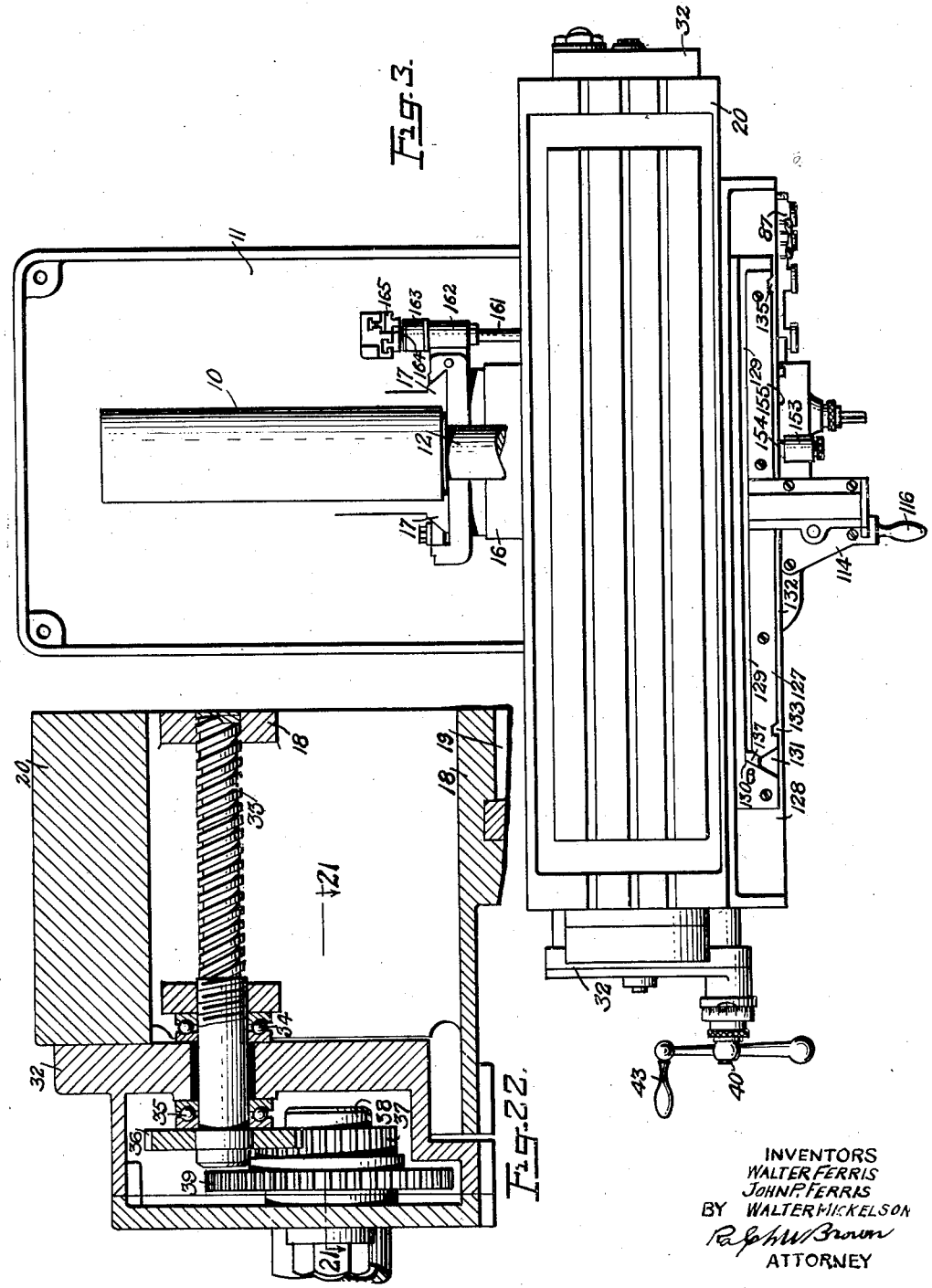

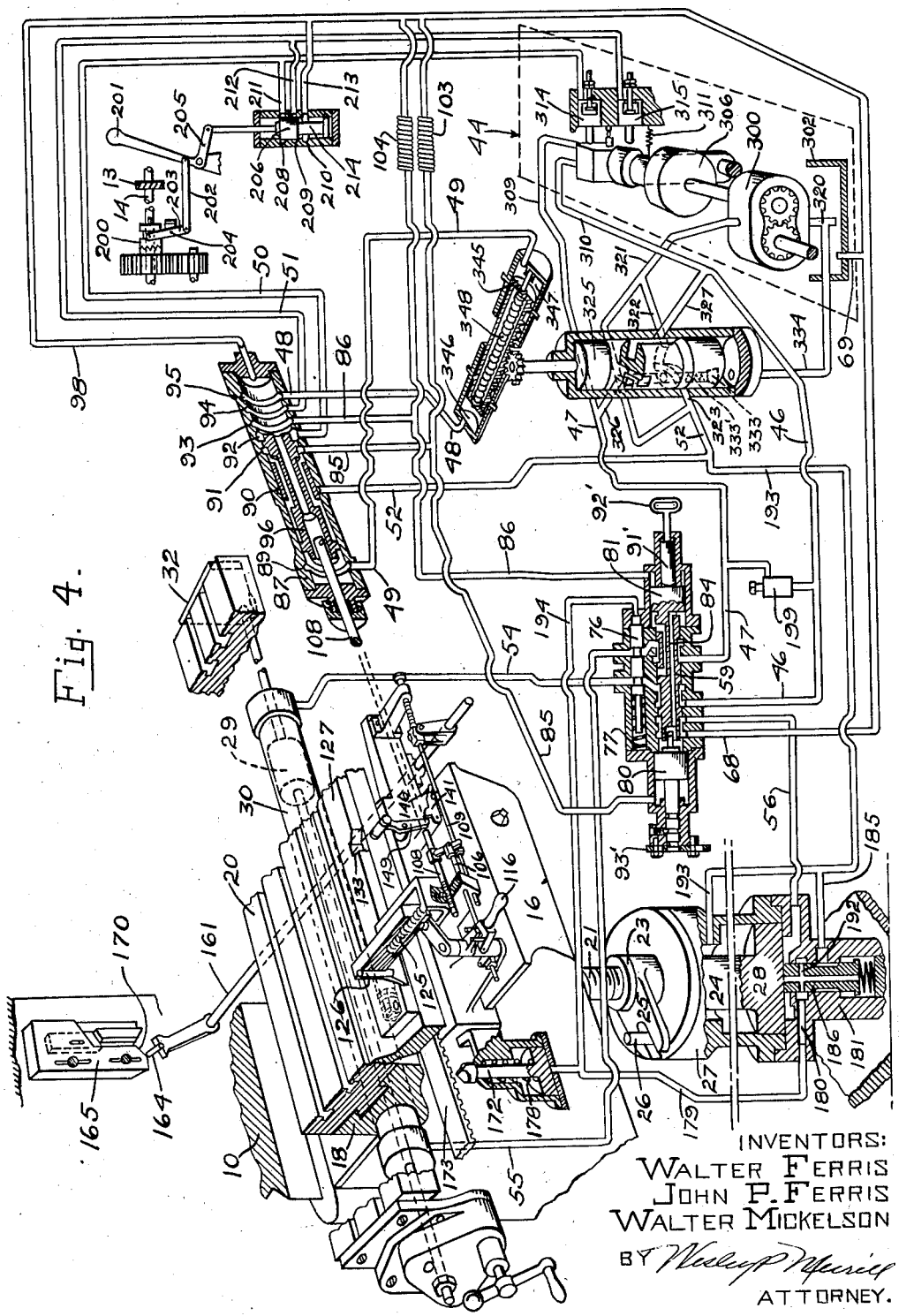

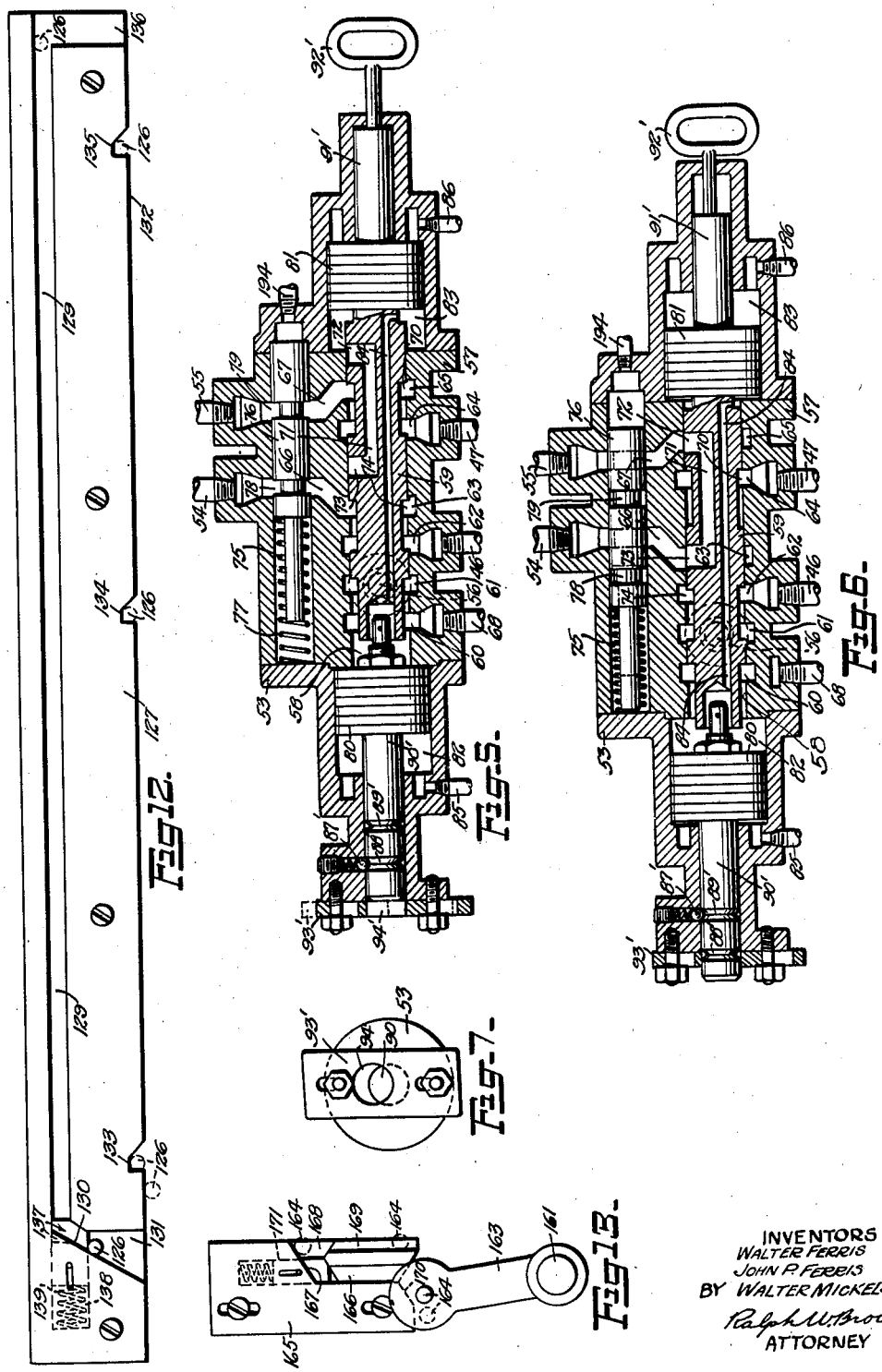

March 26, 1935.　　W. FERRIS ET AL　　1,995,638
MILLING MACHINE
Filed June 18, 1926　　12 Sheets-Sheet 6
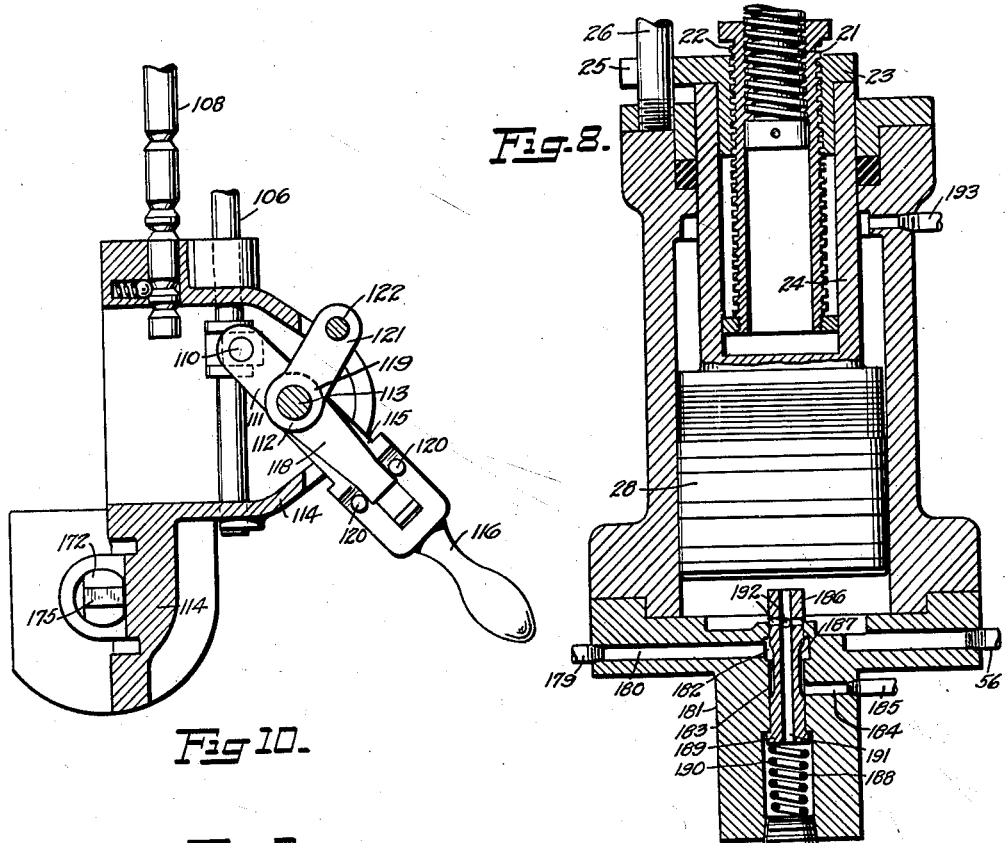
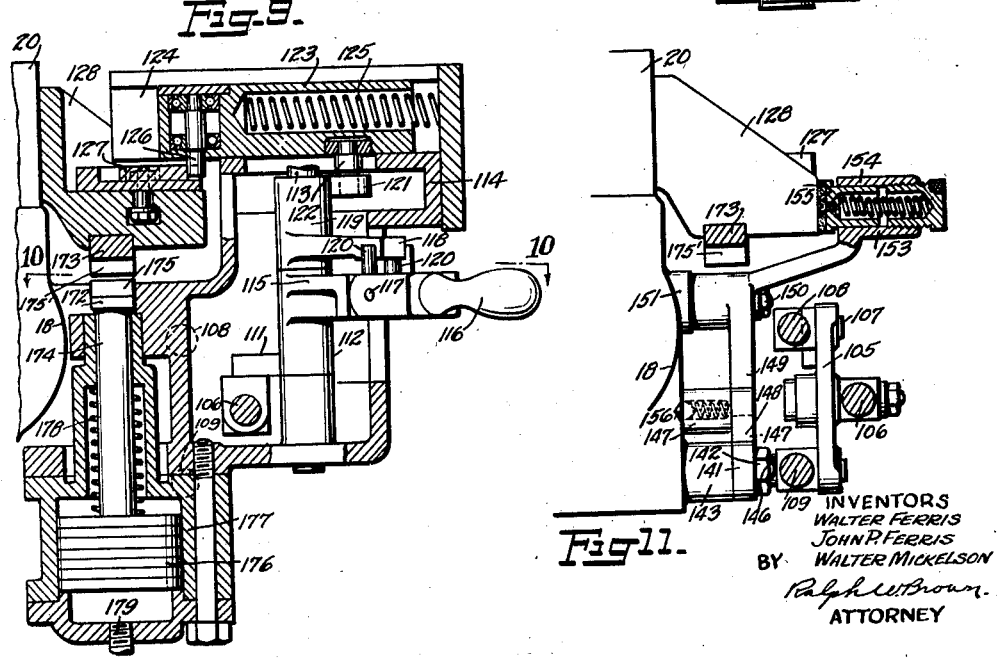
INVENTORS
WALTER FERRIS
JOHN P. FERRIS
BY WALTER MICKELSON
Ralph W. Brown
ATTORNEY

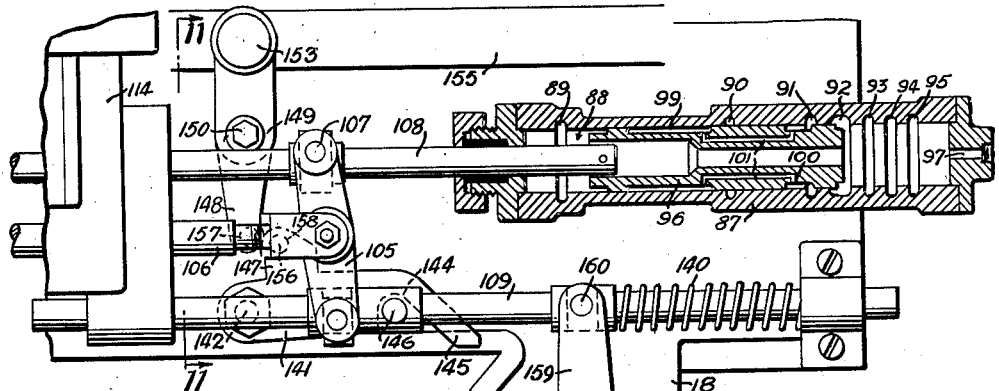
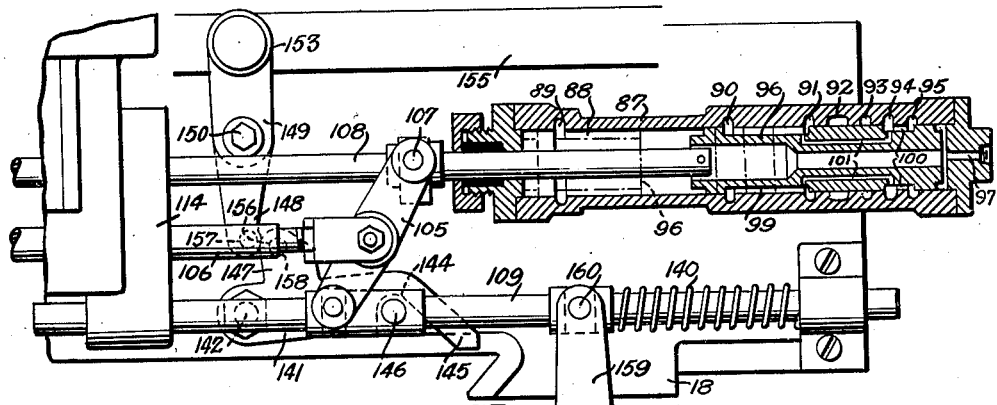
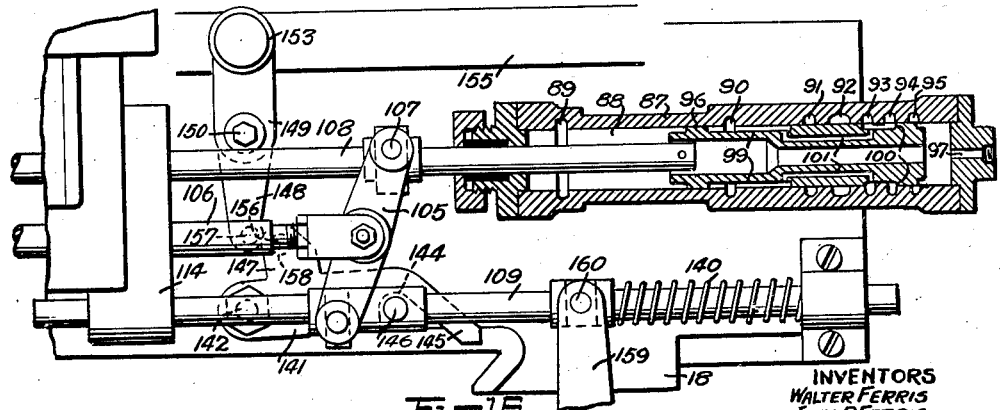

March 26, 1935.  W. FERRIS ET AL  1,995,638
MILLING MACHINE
Filed June 18, 1926  12 Sheets-Sheet 9

INVENTORS
WALTER FERRIS
JOHN P. FERRIS
BY WALTER MICKELSON
Ralph L. W. Brown.
ATTORNEY March 26, 1935.  W. FERRIS ET AL  1,995,638
MILLING MACHINE
Filed June 18, 1926   12 Sheets-Sheet 10
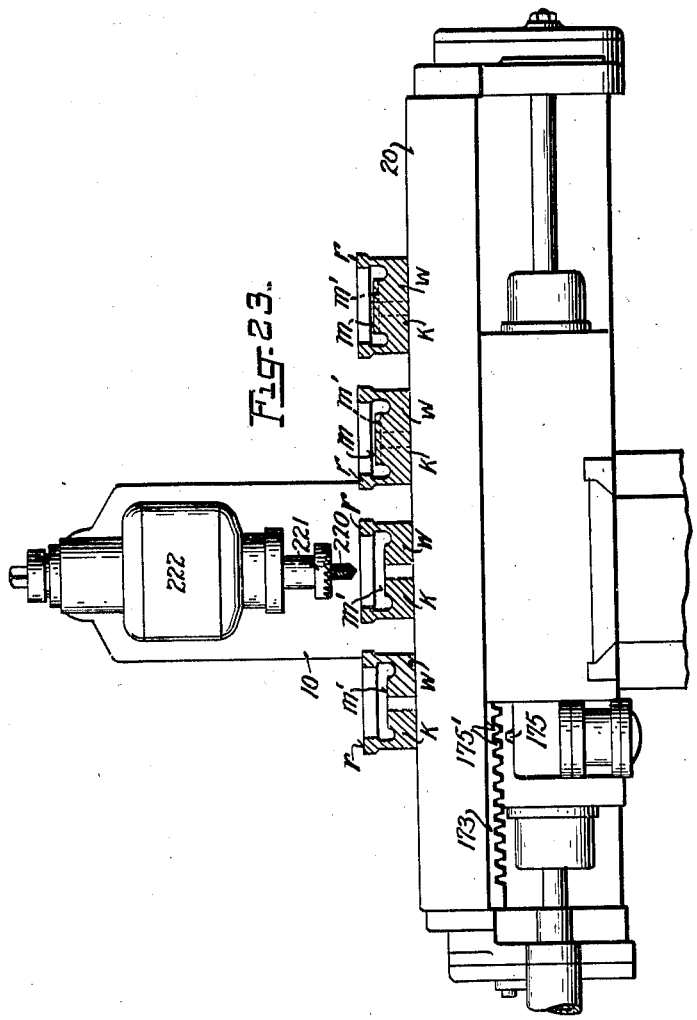
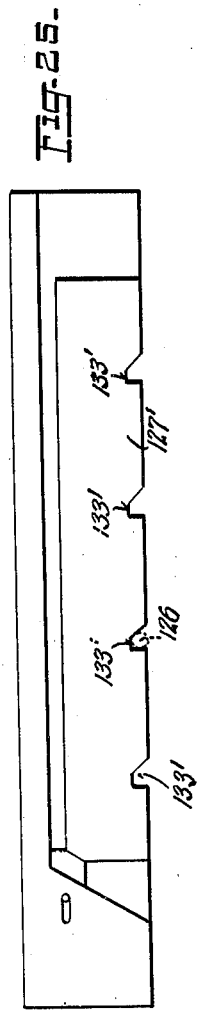
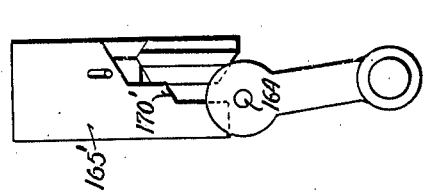
INVENTORS
WALTER FERRIS
JOHN P FERRIS
BY WALTER MICKELSON
Ralph W Brown
ATTORNEY March 26, 1935.  W. FERRIS ET AL  1,995,638
MILLING MACHINE
Filed June 18, 1926   12 Sheets-Sheet 11

Inventors
WALTER FERRIS.
JOHN P. FERRIS.
WALTER MICKELSON
By
attorney.

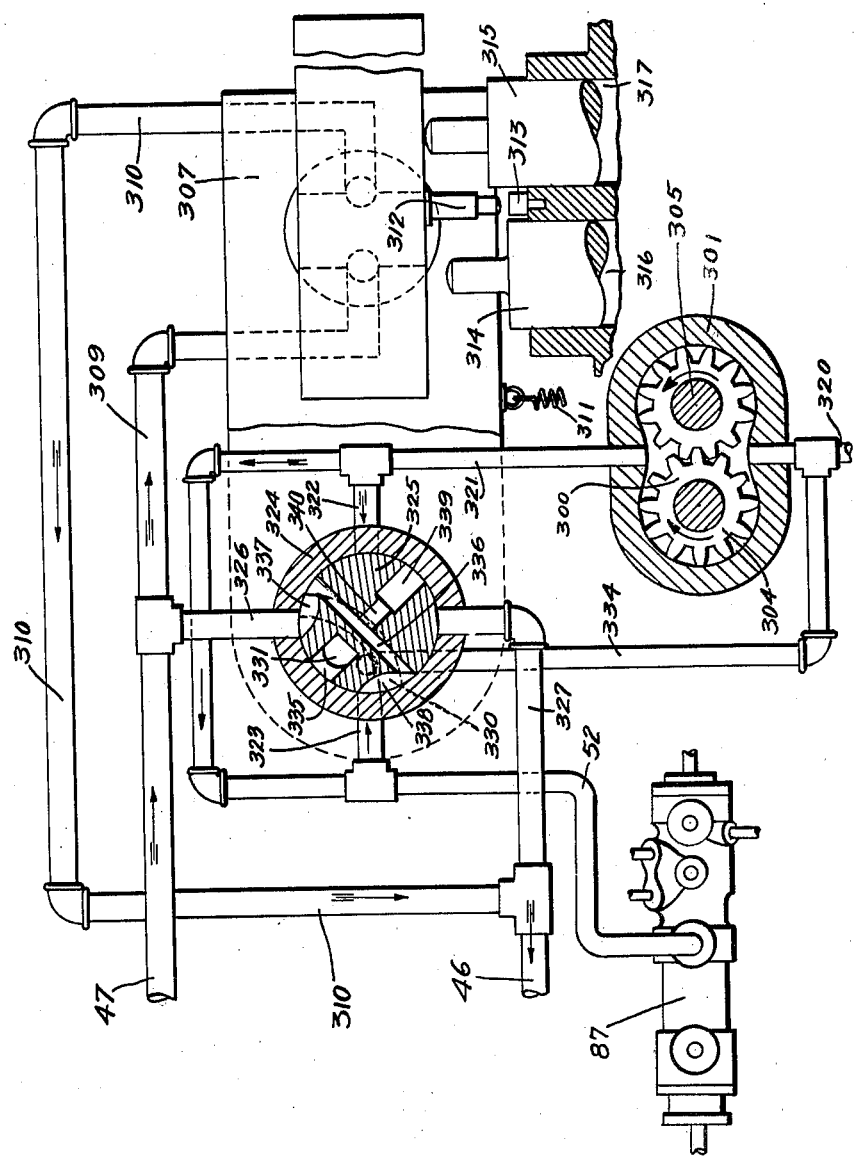

Patented Mar. 26, 1935

1,995,638

UNITED STATES PATENT OFFICE 1,995,638

MILLING MACHINE

Walter Ferris, John P. Ferris, and Walter Mickelson, Milwaukee, Wis., assignors to The Oilgear Company, Milwaukee, Wis., a corporation of Wisconsin Application June 18, 1926, Serial No. 116,819

40 Claims. (Cl. 90—21.5)

This invention relates to hydraulic transmissions for driving machine tools such as milling machines and the like.

In milling machines heretofore designed the table is driven lengthwise only. Although provision is ordinarily made for adjusting the table vertically and laterally to align the work and tools, and in some instances for dropping the table slightly after a feeding stroke to provide clearance for a return stroke, the only available feed motion is in a direction lengthwise of the table. Such machines are therefore limited in use to those operations in which the cut progresses lengthwise of the table. Furthermore such machines are not adapted for operations in which lugs or projections on the work pieces render the faces to be machined inaccessible by table movements in a single plane only.

This invention has as an object to provide a machine tool with a hydraulic transmission by means of which a table or carriage of the machine tool may be given two distinct movements in different directions with an accurate control of the rates of movement and distances traveled by the table in both directions.

Another object is to provide a machine tool with a jump feed by means of which the table of the machine may be advanced rapidly step by step to different positions and accurately retained in each of those positions while the work is being operated upon by the tool.

Another object of the present invention is the provision in a milling machine of means for effecting and accurately controllable feed movement in a direction other than and in addition to the usual lengthwise movement. The line or cut may thus extend in either of two directions, so that the field of use is extended beyond the limitations heretofore imposed. This two-directional feed movement is particularly useful in these operations where lugs or projections on the work would otherwise interfere with the ordinary table movements.

Another object is the provision of mechanism for automatically effecting intermittent and positively positioned advances of a driven member through accurately predetermined distances in one direction and for automatically feeding and retracting the member in another direction at regulated speeds between successive advances. When applied to the table of a milling machine the table may be advanced lengthwise into successive accurately determined positions with respect to the tool, and fed toward and from the tool at accurately regulated speeds in each position. When so applied, each advance is preferably performed at relatively high speed, each feed movement toward the tool preferably at a speed which may be reduced during such movement to a moderate or low speed appropriate for a cutting feed, and each movement of the table from the tool preferably at high speed. All movement of the table necessary to align the work and tool may thus be quickly and accurately performed, and the rate of movement during the cut accurately regulated to that most appropriate for the particular cut.

Another object is the provision in a drive of the character mentioned of means for predetermining with extreme accuracy the distance traveled by the driven member in both directions of movement.

Another object is the provision of hydraulic means for driving work tables and the like in differet directions at controlled rates and through exact distances.

Another object is the provision of means adjustable at will to permit the table to be driven either by hand or by power.

Other objects and advantages will appear from the following description of an illustrative embodiment of the present invention.

In the drawings:—

Fig. 1 is a front elevation of a milling machine, equipped with a hydraulic drive constructed in accordance with the present invention.

Fig. 2 is a side elevation.

Fig. 3 is a top plan view with the cutter spindle broken away.

Fig. 4 is a diagram of the hydraulic circuit employed in the machine.

Figs. 5 and 6 are sectional views of a valve, illustrating two positions thereof.

Fig. 7 is a view of the end of the valve.

Fig. 8 is a sectional view of a vertical feed cylinder.

Fig. 9 is a detailed view of the main control mechanism.

Fig. 10 is a sectional view on the line 10—10 of Figure 9.

Fig. 11 is a detail view taken substantially along the line 11—11 of Figure 14.

Fig. 12 is a detail view of the horizontal control cam.

Fig. 13 is a detail view of the vertical control cam.

Figs. 14 to 19 are views of the pilot valve with its associated control mechanism, illustrating the various positions of the parts thereof at successive stages of an operating cycle.

Fig. 22 is a vertical section on the line 22—22 of Figure 20.

Fig. 23 is a fragmentary view in front elevation of the machine, illustrating its adaptation to work of a different character.

Figs. 24 and 25 are face views of the cams employed for this particular operation.

Fig. 28 is a diagrammatic illustration of the hydraulic connections within the pump housing.

Figure 29:
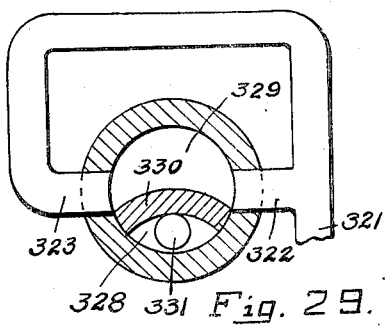
Figure 30:
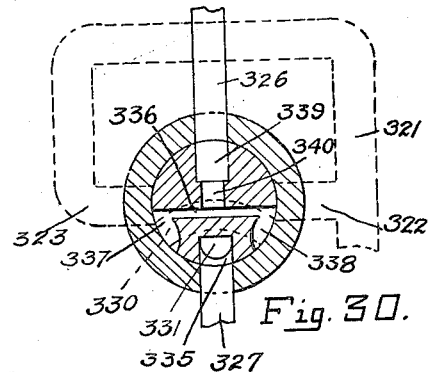
Figure 31:
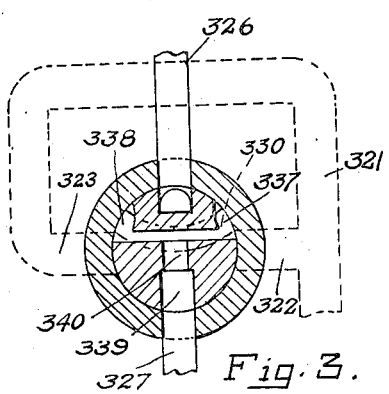
Figure 26:
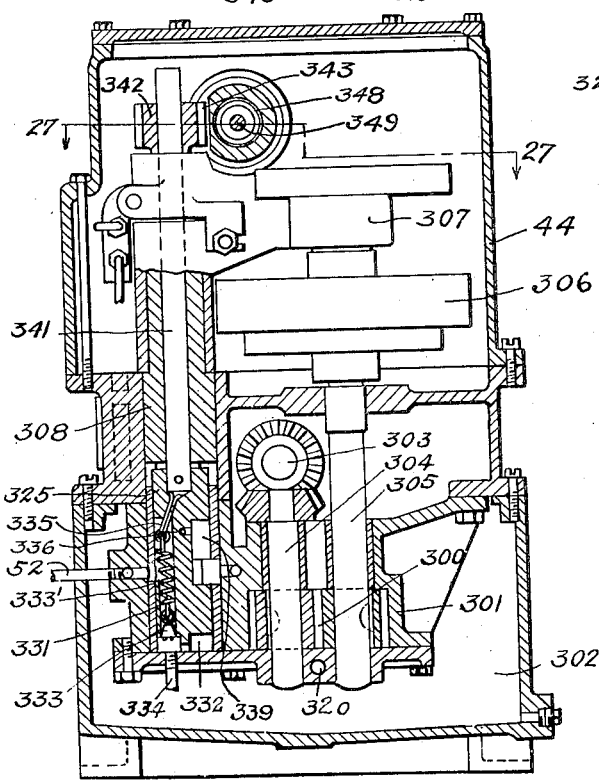
Fig. 26 is a vertical sectional view of the pump shown in Fig. 4.

Figs. 29, 30, and 31 are sectional views of a rotary valve included in Fig. 28, illustrating other characteristic positions thereof.

The milling machine selected for illustration comprises the usual upright frame 10, mounted upon the base 11, and supporting the over-arm 12. A milling cutter 13 is shown on the drive shaft 14, projecting from the frame 10, and supported by the usual bracket 15 depending from the over-arm 12 in the customary manner. A knee 16, guided in vertical ways 17 on the front face of the upright frame, supports the usual saddle 18, which is mounted on ways 19, for adjustment toward and from the upright frame. The saddle 18 supports the table 20 mounted in the usual manner for lengthwise travel thereon beneath the cutter 13.

The knee 16 is supported by the usual screw 21 (Figs. 1, 4 and 8) telescoping in a screw 22, which in this instance is threaded through a sleeve 23, fitted in and supported by the upper end of a plunger 24. The sleeve 23 is held against rotation by an arm 25, extending laterally therefrom, and forked to slidably engage an upright guide rod 26 anchored in the upper end head of a cylinder 27. The cylinder 27 is mounted upon the base 11 and a piston 28, formed on the lower end of plunger 24, is closely fitted for vertical reciprocation within the cylinder. The piston 28 is actuated and controlled hydraulically by mechanism to be hereinafter described, so as to raise and lower the knee 16, and consequently the table 20, toward and from the cutter 13.

Lengthwise movement of the table 20 upon the saddle 18 is effected hydraulically by a piston 29, (see Fig. 4) closely fitted for reciprocation in a cylinder 30, fixed to the saddle 18. The piston 29 is connected through rods 31 with appropriate brackets 32 fixed to and depending from the opposite ends of the table 20.

Figure 20:
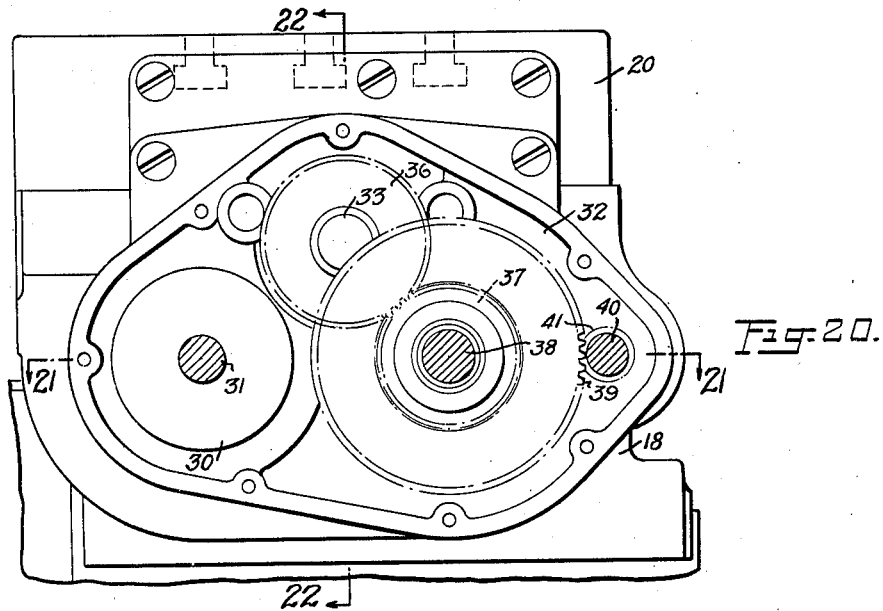
Fig. 20 is an elevation of the left end of the work carriage, with gear case cover removed as indicated by the line 20—20 of Figure 21.
Figure 21:
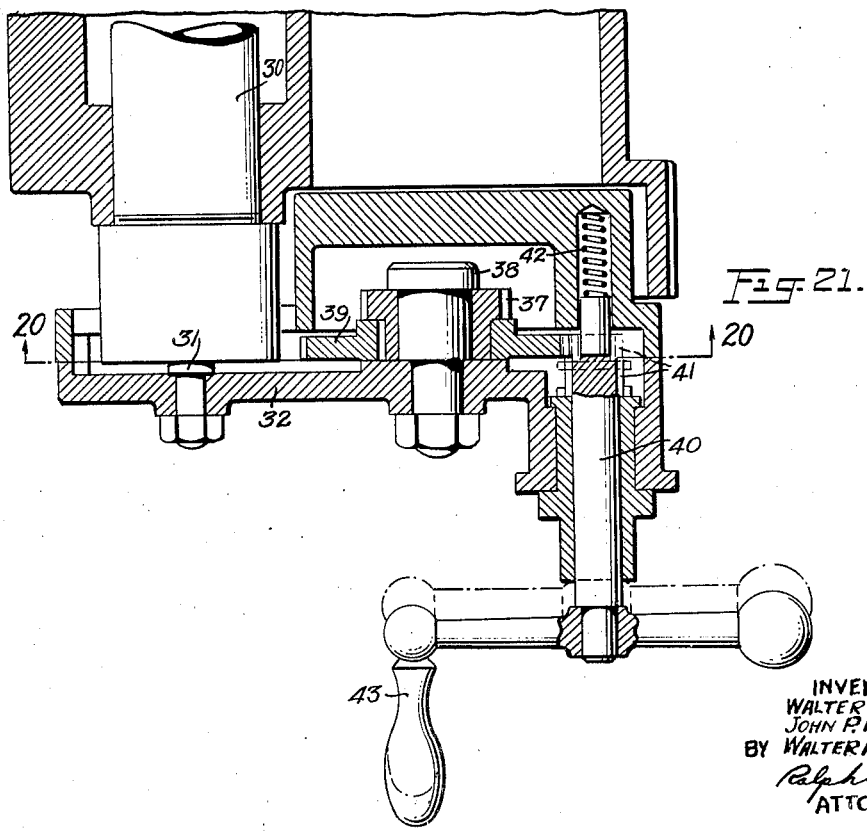
Fig. 21 is a horizontal section on the line 21—21 of Figure 20.

Provision is also made for operating the table by hand. Mechanism for this purpose is shown in Figures 20, 21 and 22. This mechanism includes a screw 33 journalled at one end in the bracket 32 at the left end of the table. This screw is retained against longitudinal movement in the bracket 32 by means of end thrust bearings 34 and 35. The screw is threaded thru a portion of the saddle 18 so that rotation of the screw in either direction will result in endwise movement of the table with respect to the saddle. The angular pitch of the threads of the screw are such that the screw is not self-locking, that is, the screw will rotate freely upon endwise movement of the table in either direction.

The screw 33 is operated by a gear 36, fixed thereto and meshing with a pinion 37 rotatable upon a stud 28 fixed in the bracket. A gear 39 is keyed or otherwise fixed to the hub of the pinion 37 so as to rotate therewith. A spindle 40 journalled in the bracket 32, and lengthwise movable therein, carries a pinion 41 adapted to mesh with the gear 39. A spring 42 yieldably maintains the spindle 40 in the full line position shown in Figure 21, so that pinion 41 is normally out of mesh with gear 39. By forcing the spindle inwardly, however, against the resistance of the spring 42, pinion 41 may be thrown into engagement with the gear 39. The spindle carries an appropriate operating handle 43. In the normal outward position of the spindle 40, such as shown in full lines in Figure 21, the screw is free to turn, during lengthwise movement of the table 20, under the action of the piston 29, and by thrusting the spindle and pinion 41 inwardly the screw may be placed under the control of the handle 43 and the table 20 adjusted lengthwise by the operator.

In the machine shown the piston 29 is actuated by liquid delivered into one end or the other of the cylinder 30 from an appropriate pump. A pump unit which may be employed is indicated diagrammatically at 44 in Figs. 2 and 4, has some of its details shown in Figs. 26 to 31 and is fully illustrated and described in Patent No. 1,854,127 issued to Walter Ferris on application Serial No. 87,791, filed February 12, 1926. This pump unit 44 is driven at substantially constant speed thru a pulley 45, and is capable of delivering liquid at controlled variable rates thru either a pipe 46 or a pipe 47. The direction and rate of flow of liquid discharged by pressure fluid supplied thru the pump is controlled by pipes 48, 49, 50 and 51 (Figs. 4 and 27), and pressure is maintained under all conditions of operation in a pipe 52 (Figs. 4 and 28) leading from the pump unit.

The pump unit 44 includes a gear pump 300 of relatively large capacity, contained within an auxiliary housing 301 immersed within a sump 302 formed in the base of the pump housing. The gear pump is driven at constant speed from the pulley 45 through shafts 303 and 304 and a shaft 305 connected with one of the gears thereof drives a variable displacement pump 306 of a well known type and of relatively small capacity, disposed in the upper part of the housing. The displacement of pump 306 is regulated and controlled by a horizontal arm 307 mounted to swing about a post 308 rigidly mounted within the housing. The intake and discharge sides of the pump 307 are permanently connected to the pipes 47 and 46, respectively, through appropriate connections 309 and 310. The arm 307 is urged by a spring 311 in such direction as to yieldably maintain a stop 312, carried thereby, against a stationary stop 313, in which position the displacement of pump 306 is zero there is no flow in pipes 309 and 310. Two plungers 314 and 315 are independently operable to force the arm 307 different distances away from the stop 313 to thereby cause the pump 306 to deliver liquid at either of two rates into the connection 310. The plungers 314 and 315 are fitted in cylinders 316 and 317, respectively, formed in the pump housing, and connected with the control pipes 50 and 51, respectively. Appropriate adjustable stops 318 and 319 limit the strokes of the plungers 314 and 315 and thus serve to predetermine the extent of movement of arm 307, and consequently to predetermine the degree of pump displacement effected by energizing either plunger.

The gear pump 300 receives liquid from the sump through a connection 320 and discharges into a connection 321, which is permanently connected with the pipe 52 leading to the pilot valve 87 to be later described. The connection 321 has two branch leads 322 and 323 which lead to diametrically opposite points in a cylindrical valve housing 324 containing a rotary valve 325 which controls communication between the gear pump 300 and the circuit fed by the variable displacement pump 306. Two branch leads 326 and 327 from diametrically opposite points in the valve housing 324, intermediate the leads 322 and 323 and above the plane thereof, lead to the connections 309 and 310, respectively.

The rotary valve 325 is of cylindrical form for the most part, but, in the plane of the leads 322 and 323 it is cut away on opposite sides to form chambers 328 and 329 separated by an arcuate partition 330. Lead 322 communicates with chamber 329 in all positions of the valve, and lead 323 is opened to either of these chambers by rotation of the valve. A passage 331 leads downwardly from chamber 328 to a chamber 332, in the bottom of the valve housing, the lower end of passage 331 being closed by a pressure relief valve 333, loaded by a spring 333'. The chamber 332 communicates with the intake connection 320 of the gear pump through a pipe 334. An open sided channel 335 extends upwardly from chamber 328 into the plane of leads 326 and 327.

The valve is further provided with a transverse passage 336, above the chambers 328 and 329 and within the plane of leads 326 and 327 which when the valve 325 is in an intermediate position forms a direct connection between leads 326 and 327 to thus form a bypass connection between the connections 309 and 310 connected with the intake and discharge sides of the pump 306. Passage 336 terminates in laterally disposed extension cavities 337 and 338 which maintain communication with lead 326 or 327 during partial rotation of the valve from intermediate position. An open sided channel 339 leading upwardly from chamber 329 into the plane of leads 326 and 327 communicates with transverse passage 336 through a passage 340.

The valve 325 is actuated and controlled by a stem 341, rotatable in the post 308, and carrying a pinion 342 which meshes with and is actuated by a rack 343 in the form of a hollow plunger having piston heads 344 and 345 formed at the opposite ends thereof. Head 344 is fitted in a cylinder 346 communicating with pipe 48, and head 345 is fitted in a cylinder 347 communicating with the pipe 49. A caged spring 348 housed within the plunger coacts with a rod 349 anchored in the end head of cylinder 347 to yieldably retain the plunger in the intermediate position of Fig. 27, in which position the valve 325 assumes the position shown in Fig. 28.

With the valve 325 in the position shown in Fig. 28 pipe 321, containing liquid under pressure from the gear pump 300, is connected to the connection 309, leading to the return side of pump 306, through the lead 322, chamber 329, channel 339, passages 340 and 336, extension cavity 337, and lead 326; so that a column of liquid under pressure is maintained within the lead 326, which maintains the connection 309 substantially closed and filled with liquid under pressure. In this position of valve 325 pipe 321 is also connected to the passage 331 in the valve through the lead 323 and chamber 328, so that excess liquid from the gear pump may force its way past the valve 333 into the chamber 332, the tension in the spring 333' determining the pressure required to open the valve 333 and thus determining the pressure maintained in pipe 321, lead 326, and connection 309. Such is the position and function of valve 325 so long as there is no pressure in control pipes 48 and 49.

But when pipe 49 is exposed to pressure the rack 343 is shifted upwardly (Fig. 27) to thereby rotate valve 325 into the position shown in Figs. 29 and 30, in which position both leads 322 and 323 are open to the lead 326 through the chamber 329 and channel 339, so that the entire discharge from the gear pump passes through lead 326 and connection 309 into the pipe 47 to thereby produce a rapid flow therein, and liquid returning through pipe 46 and lead 327 forces its way back to the return side of the gear pump through chamber 328, passage, 331, relief valve 333, chamber 332, and pipe 334. Similarly when pipe 48 is exposed to pressure the rack 343 is shifted downwardly (Fig. 27) to thereby rotate the valve 325 into the position of Fig. 31, in which position both leads 322 and 323 are connected through channel 339 and lead 327 to the pipe 46 to effect a rapid flow of liquid therethrough, and liquid returning through pipe 47 finds its way back to the return side of the gear pump through lead 326, chamber 328, passage 331, chamber 332, and pipe 334. The liquid discharged from the gear pump 300 is thus directed into one or the other of the pipes 46 or 47 by rotation of the valve 325 into one or the other of the positions shown in Figs. 31 and 30 to thereby effect rapid movement of the piston 29 and table 20 in one direction or the other, and when the valve 325 is in the position shown in Fig. 28 the liquid discharged from the gear pump merely maintains a column of liquid under pressure in the lead 326 to thereby maintain the connection 309 substantially closed and flooded with liquid under pressure, the pressure being determined by the relief valve 333 and particularly the tension in the spring 333' thereof.

Figure 27:
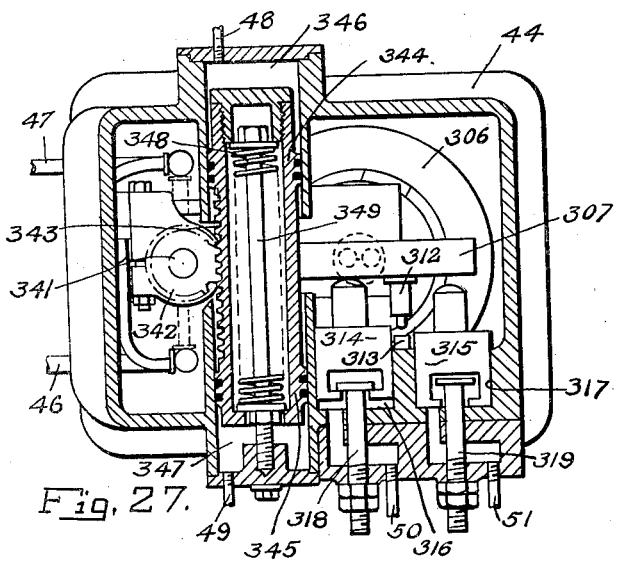
Fig. 27 is a horizontal sectional view taken upon the line 27—27 of Fig. 26.

During feed movements of the table 20 the circuit including pipes 46 and 47 is energized by liquid supplied from the variable displacement pump 306, and during these feed movements the valve 325 remains in the position shown in Fig. 28. To effect a slow feed movement pipe 50 is exposed to pressure to thereby advance the plunger 314 and thus swing the arm 307 upwardly (Figs. 27 and 28) through a limited distance, whereupon the pump 306 discharges through connection 310 into pipe 46 causing liquid to flow slowly therethrough, and liquid returning through pipe 47 passes directly through connection 309 to the intake side of the pump, the column of liquid under pressure in lead 326 preventing escape therethrough. To operate the table at a faster rate the displacement of pump 306 is increased by exposing pipe 51 to pressure to thereby advance the plunger 315 and thus force the arm 307 further upwardly (Figs. 27 and 28). When the pressure in both of pipes 50 and 51 is destroyed the arm 307 is returned by the spring 311 into position with stop 312 against stop 313, in which position pump displacement is zero and there is no flow in pipes 46 and 47.

Delivery of liquid from the pump unit 44 to the cylinders 27 and 30 is controlled by a valve 53 thru which the pipes 46 and 47 are connected to two pipes 54 and 55 leading to opposite ends of the table cylinder 30, and from which a pipe 56 leads to the lower end of the lifting cylinder 27.

The valve 53 is shown in detail in Figures 5, 6, and 7. It comprises a block 57 having a cylindrical bore 58 therein, containing a substantially cylindrical valve element 59. A series of annular grooves 60, 61, 62, 63, 64 and 65 surround the bore 58. Pipe 56 connects with groove 61 and pipes 46 and 47 connect with grooves 62 and 64, respectively. Grooves 63 and 65 are respectively connected with passages 66 and 67 leading upwardly from the valve block and connected with pipes 54 and 55. A pipe 68 connected with groove 60, communicates with a pipe 69 leading to a liquid reservoir in the base of the pump.

The valve element 59 contains a passage 71 terminating in ports 72 and 73 adapted to communicate with passages 66 and 67 respectively, when the valve element is in the position shown in Figure 6. The valve element also contains a relatively wide annular groove 70 which is always open to the groove 64, communicating with pipe 47, and when the valve element is in the position shown in Fig. 5, groove 70 also communicates with groove 65 communicating with passage 67. A similar annular groove 74 is always open to groove 62, communicating with pipe 46, and with the valve in the position shown in Figure 6, groove 74 also communicates with groove 61, which is open to pipe 56. The left end of the valve is reduced, so that when the valve is in the position of Fig. 5, groove 61 is open to groove 60, and consequently communicates with the discharge pipe 68. A bore 75 in the upper end of the valve block intersects passages 66 and 67. A piston 76 within the bore 75 is yieldably held by a spring 77 in the position shown in Fig. 5, in which position reduced portions 78 and 79 thereof permit a free flow through the passages. When this piston 76 is shifted toward the left into the full line position shown in Fig. 6, however, both passages 66 and 67 are blocked.

The valve element 59 is actuated and controlled by pistons 80 and 81 fixed to the opposite ends thereof and mounted for reciprocation within bores 82 and 83, respectively, formed in the opposite end heads of the valve block 57. A passage 84 extending longitudinally thru the valve element 59 maintains communication between the inner ends of the bores 82 and 83. Pipes 85 and 86 communicate with the outer ends of the bores 82 and 83, respectively. The arrangement is such that when fluid pressure is applied to pipe 85 the valve element 59 is shifted into the position of Fig. 5 and when fluid pressure is applied to the pipe 86, the valve element is shifted into the position of Fig. 6. Any appropriate means such as a spring loaded ball 87' cooperating with grooves 88' and 89' in a stem 90' connected with piston 80, may be employed for releasably retaining the valve element in either position. A similar stem 91' connected with piston 81 may be provided with an appropriate handle 92', by which the valve element 59 may be shifted by the operator.

In some conditions of operation when no vertical feed movement of the table 20 is required, it is desirable that the valve element 59 be locked in the position shown in Fig. 5. For this purpose a plate 93' is mounted upon the end face of the valve. This plate is provided with an opening 94', thru which the stem 90' may normally project when the valve is shifted toward the left. By adjusting this plate upwardly, however, into the position shown in Fig. 7, so as to position the opening 94' out of alignment with the stem 90', the stem is blocked against outward movement.

The functioning of the valve 53 is substantially as follows: When the valve is in the position of Fig. 5, pipe 56, connected with the bottom of the vertical cylinder 27, communicates through grooves 61 and 60 with the discharge pipe 68 which leads to the liquid reservoir in the base of the pump casing, so that the piston 28 is at rest in its lowermost position. In this position of the valve pipe 47 from the pump communicates with the pipe 55 leading to the left end of cylinder 30, through grooves 64 and 65 and passage 67; and pipe 46 communicates with pipe 54, leading to the right end of cylinder 30, through grooves 62 and 63 and passage 66. The connection 310, pipe 46, and pipe 54 thus form a closed passage between the discharge side of pump 306 and the right end of cylinder 30; and the pipe 55, pipe 47, and connection 309 form a closed passage between the left end of cylinder 30 and the intake side of the pump 306; so that the piston 29 is thus made to respond to the direction and rate of flow of liquid within the pipes 46 and 47. As above pointed out the valve 53 may be locked in this position by shifting the plate 93' into the dotted line position of Fig. 5, when no vertical feed movement of the table is required.

With the valve element 59 in the position of Figure 6 passage 71 therein, connects passages 66 and 67 so that the pipes 54 and 55, leading to the opposite ends of the cylinder 30, are short circuited and the piston 29 and table 20 is at rest, although it may be moved by the operator. To lock the piston 29 and table 20 against movement, the plunger 76 may be forced toward the left, into the full line position shown in this figure, to thereby block the passages 66 and 67 and prevent the flow of liquid in pipes 54 and 55. In this position of the valve element 59, groove 61 is cut off from groove 60, and discharge pipe 68, and opened to groove 62 and pipe 46, so that liquid discharged by the pump thru pipe 46 is delivered into the bottom of the vertical cylinder 27, to raise the piston 28 and thereby raise the plunger 24, knee 16, and table 20.

The pipes 85 and 86 which control the valve 53, as well as the pipes 48, 49, 50 and 51, which control the pump 44, are all controlled by an appropriate pilot valve 87, fixed to the front face of the saddle 18. As shown in Figures 4 and 14 to 19 this valve comprises a block having a longitudinal bore 88 with a series of annular grooves 89, 90, 91, 92, 93, 94, and 95 formed in the internal surface thereof. Groove 89 communicates with pipe 49, groove 90 with pipe 52, groove 91 with pipe 85, groove 92 with pipe 50, groove 93 with pipe 86, groove 94 with pipe 51, and groove 95 with pipe 48. A valve element 96 in the form of a hollow plunger is mounted for lengthwise movement within the bore 88. The opposite ends of the bore 88 are open to each other through the plunger, and a passage 97 at one end of the bore is connected through a drain pipe 98 with the pipe 69 leading to the base of the pump casing. The plunger 96 is formed with a relatively wide reduced portion 99, and a relatively narrow reduced portion 100, connected by a passage 101 in the plunger.

The groove 90 is maintained flooded with liquid under pressure supplied through pipe 52 from the pump. With the plunger 96 in the intermediate position of Figures 14 and 18 and groove 90 is closed by that portion of the plunger intermediate the reduced portions 99 and 100. When the plunger 96 is shifted into the right extreme position of Figures 15 and 19 communication is established between grooves 90 and 91 through the reduced portion 99, and pressure is applied to pipe 85 to shift the valve 53 into the position of Figure 5. In this position of the valve fluid pressure is also transmitted through the passage 101, the reduced portion 100, the grooves 94 and 95 and the pipes 51 and 48 to the cylinders 317 and 346 (Fig. 27) so that the pump 306 is adjusted so as to deliver liquid at a relatively high rate and the valve 325 is adjusted to direct the output of both pumps through pipe 46, to the valve 53, and through this valve and pipe 54 to the right end of the cylinder 30, to cause the piston 29 and table 20 to travel toward the left at high speed.

When the plunger 96 is shifted into the position shown in Figure 16 fluid pressure is transmitted from groove 90 through reduced portion 99, passage 101 and reduced portion 100 to grooves 93 and 94, and through them to the pipes 86 and 51, and the groove 95 is open to the drain pipe 98 to permit the spring 348 (Fig. 27) to return the valve 325 to its Fig. 28 position. Pressure thus applied to pipe 51 adjusts the pump 306 so that liquid is discharged therefrom at a relatively high rate but, since the gear pump 300 is at this time discharging past the relief valve 333, the pump unit 44 discharges liquid at a moderate rate through pipe 46. Pressure thus applied to pipe 86 shifts the valve 53 into the position of Figure 6, so that pipe 54 is closed to pipe 46 and the piston 29 comes to rest, and pipe 56 is opened to pipe 46 causing the piston 28 to rise at a moderate rate.

Figure 17:
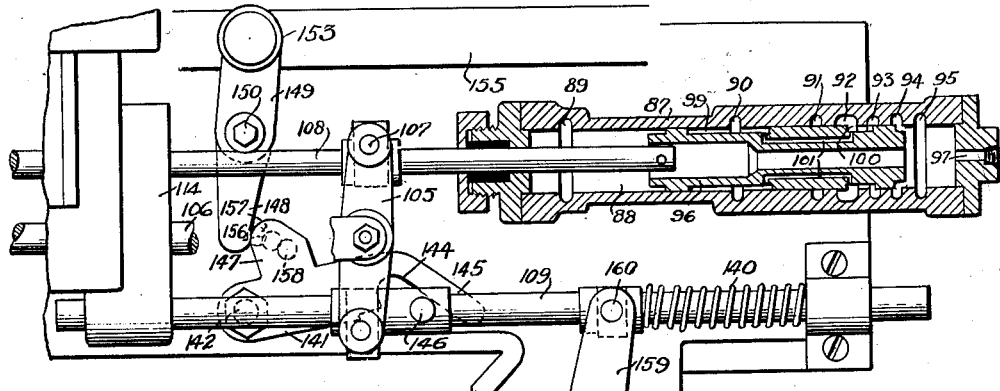

When the plunger 96 is shifted into the position shown in Figure 17 the grooves 92 and 93 are open to the fluid pressure in reduced portion 100, so that the pressure in pipe 86 is maintained to hold the valve plunger 59 in its Fig. 6 position, and pressure is applied to pipe 50 to advance the plunger 314. At the same time, the groove 94 is opened to the drain pipe 98 to permit the arm 307 (Fig. 27) to be moved by its spring against the plunger 314 to thereby reduce the rate of flow through pipes 46 and 56. The piston 28 will then continue its rise at a reduced rate.

Figure 18:
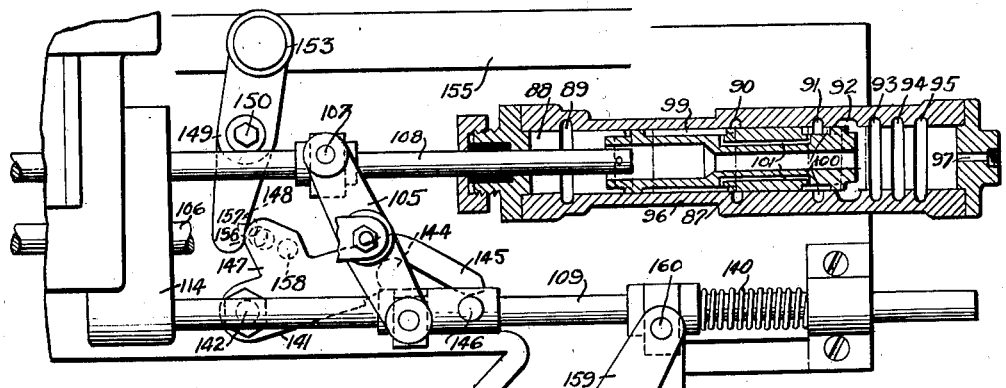
Figure 19:
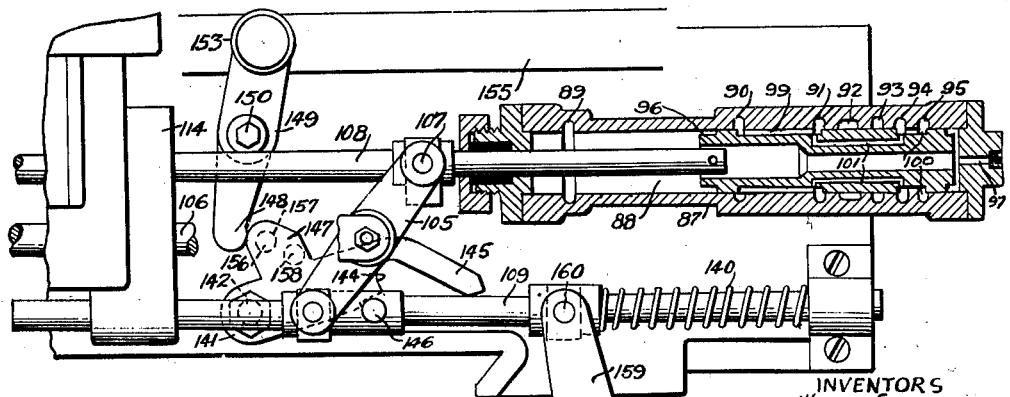

In passing from the position of Figure 17 to that of Figure 18 the plunger 96 assumes the position shown in dotted lines in Figure 18, in which position groove 91 is open to the pressure in reduced portion 100, and this pressure, transmitted through pipe 85, returns the valve 53 into the position of Figure 5 so that pipe 56 is opened to the discharge pipe 68 and piston 28 lowers.

It will be noted from Figure 4 that pipes 85 and 86 are both permanently connected to the pipe 98 which leads to the drain pipe 69. The discharge of liquid from pipes 85 and 86 into the pipe 98 is restricted by any appropriate means such as coils 103 and 104 of capillary tubing. The arrangement is such that when pressure is applied through pipe 85 to the bore 82 fluid may escape slowly from bore 83 through pipe 86 and choke coil 104, so as to permit movement of the valve element 59 toward the right; and when pressure is applied through pipe 86 to the bore 83, liquid may escape slowly from bore 82 through pipe 85 and choke coil 103, to permit movement of the element 59 toward the left.

It will be further noted that when the plunger of valve 53 is locked in the position of Fig. 5, by shifting the locking plate 93' into the dotted line position, it is unaffected by the pilot valve 87 or by the pressure in pipes 85 or 86, and thus maintains a permanent connection between pipes 46 and 54 and between pipes 55 and 47 with pipe 56 permanently disconnected therefrom, so that the piston 29 then moves in a direction and at a rate dependent upon the rate and direction of flow in pipes 46 and 47 and as determined by the position of the pilot valve 87. The pilot valve 87 is placed under the joint control of mechanism which responds to the lengthwise movement of the table 20 and mechanism which responds to the vertical movement of the table. This is accomplished in the machine shown by the use of a floating lever 105. The lever 105 is pivotally supported intermediate its ends upon a horizontal slide rod 106. The upper end of the lever is operatively engaged through a trunnion-and-block connection 107 with a stem 108 connected with the plunger 96 of the valve 87, and the lower end of the lever is connected in a similar manner with a horizontal slide rod 109.

Rod 106 is operatively engaged through a trunnion-and-block connection 110 with a horizontal arm 111, carried by a sleeve 112 mounted loosely upon a vertical shaft 113, (see Figures 9 and 10). The shaft 113 is fixed in an appropriate bracket 114 fixed to the front of the saddle 18, at one side of the table 20. The sleeve 112 also carries an arm 115, having a handle 116 extending therefrom and mounted upon a horizontal pivot pin 117 fixed in the end of arm 115. An arm 118, projecting from a second sleeve 119, also loosely mounted on the shaft 113, is normally engaged between upright pins 120 on the handle 116, so that the handle and arm 115 normally swings therewith. By swinging the handle downwardly however on the pin 117, the pins 120 may be swung clear of the arm 118, so as to disconnect the handle from the arm 118. The sleeve 119 carries an arm 121 having an upright pin 122 operatively engaged with a slide block 123 mounted for lengthwise reciprocation in a transverse guide 124 carried by the bracket 114, so that arms 121 and 118 are caused to swing in response to lengthwise movement of block 123. A compression spring 125 tends at all times to force the block 123 toward the left (Fig. 9). A vertical pin 126, rotatably mounted in the left end of the block, cooperates with a horizontal cam plate 127, carried by a bracket 128, fixed to the side of the table 20. The cam plate 127, traveling with the table 20, controls the slide block 123, and thus normally controls the rod 106 through the mechanism just described.

The form of the cam plate 127 is of course dependent upon the character of the work to be performed and for an ordinary milling operation requiring only longitudinal movement of the table the cam plate may assume a form similar to that described in the copending application hereinabove identified to automatically regulate the rate and direction of table movement in the manner therein described. In Figures 1 and 2 the machine is shown operating upon a shaft $a$ to form three short keyways $b$ at spaced predetermined points $x$, $y$ and $z$ therein. In the position shown in Figure 1, the table is about to be lifted toward the tool 13 to form a keyway at point $y$. The keyway $b$ at point $x$ has already been formed and the table 20 has been shifted longitudinally to position point $y$ beneath the cutter. After a keyway has been formed at point $y$ the table will again be shifted to position point $z$ beneath the cutter. The cam plate 127, shown in detail in Figure 12, is so shaped as to effect a rapid longitudinal movement of the table toward the left into these successive positions and to thereafter return the table into its starting position at the right. This particular cam plate is formed with a longitudinal groove 129 which opens at one end into a diagonal groove 130 having a flared open end 131. The front edge 132 of the plate is straight except for three notches 133, 134, and 135 formed therein. The other end of the groove 129 is open to the front edge of the plate through a cutaway portion 136. A gate in the form of a slide plate 137, mounted for lengthwise movement in a cavity 138 in the cam plate, normally projects across the diagonal groove 130, as indicated in full lines in Figure 12. A spring 139 yieldably retains the plate 137 in this position, but permits the same to be forced into the retracted position, indicated in dotted lines.

The rod 109, hereinabove mentioned, is yieldably maintained in the position shown in Figures 14, 15, and 16, by a compression spring 140 and a dog 141 pivotally mounted upon a horizontal pin 142 anchored in a boss 143 formed on the face of the saddle 18. The dog 141 is provided with a notch 144 in the lower edge thereof adjacent a downwardly inclined tail 145, and the rod 109 carries a laterally projecting pin 146, for engagement in the notch. The dog is also provided with a nose 147 projecting upwardly therefrom into contact with the lower end 148 of a kicker lever 149, pivoted intermediate its ends upon a pin 150, anchored in a boss 151 formed on the front face of the saddle. The upper arm 153 of the lever 149, carries a spring loaded plunger 154 maintained in frictional contact with the front edge 155 of the bracket 128. (See Fig. 11.) The dog 141 is yieldably retained in either of the two positions shown in Figures 14 to 16, or Figures 18 and 19 by any appropriate means such as a spring loaded ball 156 within the nose 147 engageable with either of two sockets 157 or 158 formed in the face of the saddle.

The rod 109 is actuated by a lever 159 having a trunnion-and-block connection 160 therewith and splined on a rock shaft 161 supported in appropriate brackets 162 on the knee 16. (See Figs. 1 and 2). An arm 163 fixed to the shaft 161 carries a pin 164 which cooperates with a vertical cam plate 165 adjustably fixed to the upright frame 10 of the machine. The cam plate 165 controls the vertical movement of the knee 16, saddle 18, and table 20 toward and from the cutter 13, and its form is dependent upon the character of work to be performed.

The vertical cam plate 165, shown in detail in Figure 13, is provided with a longitudinal groove 166 which opens at its upper end in a diagonal groove 167 having a flared open end 168. A second longitudinal groove 169 merges at its upper end into the flared end 168 of diagonal groove 167. The lower end of the cam plate is formed with a diagonal shoulder 170 leading toward the groove 166. A spring pressed gate 171, similar to gate 137, normally projects across the diagonal groove 167.

Provision is made in the machine shown for accurately positioning and positively locking the table 20 in each of the successive positions into which it is longitudinally shifted. Mechanism for this purpose includes an indexing pin 172 supported in the bracket 114 and cooperating with a toothed bar 173 fixed to the bottom of the bracket 128, carried by the table. The indexing pin comprises a vertical plunger 174 having a tapered tooth 175 adapted to engage between successive teeth 175' of the bar 173. The plunger 174 is supported by a piston 176 mounted for vertical reciprocation in a cylinder 177, fixed to the bracket 114. The piston and plunger are yieldably retained in the lower, retracted position, shown in Figure 9, by a spring 178. A pipe 179 connects the lower end of the cylinder 177 with a passage 180, formed in the lower end head 181 of the vertical cylinder 27.

As shown in Figures 4 and 8, passage 180 communicates with an annular groove 182 surrounding a vertical bore 183 formed in the end head 181. A second passage 184 communicating with the bore 183 is connected through a pipe 185, with the pressure supply pipe 52 leading from the pump. A plunger 186 in the bore has a reduced portion 187 through which communication is established between passages 180 and 184, when the plunger is in the elevated position of Figure 8. A spring 188 yieldably retains the plunger in this elevated position when the piston 28 is elevated. A head 189 on the lower end of the plunger limits the upward movement thereof. When the piston 28 is lowered it engages the upper end of the plunger 186 and forces it into the lower position of Figure 4, in which position the groove 182 is closed by the plunger, and passage 184 no longer communicates therewith. Communication is maintained between the cylinder 27 and the lower enlarged end 190 of the bore 183 through a longitudinal passage 191 through the plunger, by which trapping of fluid in the lower end of the bore is avoided. Radial ducts 192 leading from the passage 191 communicate with the groove 182, when the plunger is in the lower position of Figure 4. When the plunger is in the upper position of Figure 8 communication is broken between the ducts 192 and groove 182.

The upper end of the cylinder 27 is maintained flooded with liquid under pressure, supplied through a pipe 193, which is connected with the pressure pipe 52 leading from the pump. The pressure thus maintained in the upper end of cylinder 27 insures prompt lowering of the piston 28, when pipe 56, connected to the lower end thereof is opened to the discharge pipe 68 by operation of the valve 53. A pipe 194, leading from the right end of the bore 75 in the valve block 57 is connected with the pipe 179, leading to the indexing cylinder 177.

The arrangement is such that when the piston 28 is in the lower position of Figure 4, pipe 179 communicates through passage 180, groove 182, ducts 192, and passage 191 with the interior of the cylinder 27, so that when the valve element 59 of valve 53 is in the position of Figure 5, and pipe 56 is open to discharge pipe 68 no pressure exists in pipes 179 and 194, the indexing pin 172 is in retracted position, out of engagement with the bar 173, and the plunger 76 assumes the position of Figure 5. Then when the valve element 59 is shifted into the position of Figure 6, so as to open pipe 56 to the delivery pipe 46, liquid is transmitted under pressure to the lower end of the vertical cylinder 27, and through pipes 179 and 194 to elevate the indexing pin 172 into engagement with the bar 173, and to shift the plunger 76 into the full line position of Figure 6. It will be noted that in this position of the valve element 59 the passages 66 and 67 are in open communication through the passage 71, so that the pipes 54 and 55 leading to the opposite ends of the cylinder 30 are in open communication and the piston 29 and table 20 are free to move so as to permit the table to be accurately centered by the wedging action of the tapered tooth 175 between successive teeth on the bar 173. To permit this free centering action, the spring 77, acting on plunger 76, is preferably made somewhat stiffer than the spring 178, acting on the indexing pin, so that the plunger 76 will not be shifted into the position of Figure 6, until the indexing pin has been engaged with and centered the bar. When the plunger 76 has been shifted into this position the passages 66 and 67 are blocked and the pump delivery is entirely isolated from the piston 29. The table is thus protected from lengthwise thrusts which might be caused by the pump, and is held accurately in position by the index pin.

The liquid pressure thus applied to the lower end of the cylinder 27 causes the piston 28 to rise, so as to elevate the knee 16, saddle 28, and table 20 toward the tool. As this piston rises, plunger 186 rises into the position of Figure 8, to thereby break communication between ducts 192 and groove 182 and to establish communication between this groove and passage 184. Pipes 179 and 194 are thus exposed to the pressure in pipe 185, so that the indexing pin and plunger 76 are retained in table locking position.

When the valve element 59 of valve 53 is again shifted into the position of Figure 5, so as to open pipe 56 to the discharge pipe 68, the piston 28 lowers under the pressure of liquid maintained in pipe 193. The plunger 186, however, remains in the upper position of Figure 8, maintaining the indexing pin and plunger 76 in table locking position, until reengaged by the piston 28 as it approaches its lowermost position. When this occurs, the plunger 86 is depressed and the pipes 179 and 194 again opened to the pipe 56 through which the pressure therein is again destroyed. This causes the retraction of the indexing pin and the return of plunger 76 into the position of Figure 5. It will thus be noted that the table 20 is thus securely locked against longitudinal movement during its vertical movement toward and from the tool.

A description of a complete operating cycle of the machine will now be given. As above pointed out the pump is operated at substantially constant speed through the pulley 45. Before beginning an operating cycle the table 20 is ordinarily at the right extreme position shown in Figure 4, with the piston 29 in the right end of cylinder 30 and the piston 28 in its lowermost position. In this position of the parts the pin 126, carried by the slide block 123, is disposed within the diagonal groove 130 of the horizontal cam plate 127, as indicated in full lines in Figure 12; and the arm 163 is in the position shown in Figure 13 with the pin 164 thereon disposed beneath the inclined shoulder 170 on the lower end of the vertical cam plate 165. With the pins 126 and 164 in these positions, the rods 106 and 109, floating lever 105, valve stem 108, and plunger 96 of pilot valve 87 are in the respective positions of Figure 14. In this position of the plunger 96, the several grooves 89, 92, 94, and 95 are open to the drain pipe 98, so that no pressure exists in any of the pump control pipes 48 to 51 and pump displacement is zero.

To start the machine the operator swings the handle 116 (Figs. 1, 3, 9 and 10) toward the left to retract the slide block 123 and thereby withdraw the pin 126 from the diagonal groove 130 (Fig. 12). This movement of the handle 116 is transmitted to the rod 106, to shift the same longitudinally into the position of Figure 15. The rod 109 is prevented from moving by the pressure of spring 140, so that the floating lever 105 swings toward the right about its lower end as a fulcrum and shifts the plunger 96 into the full line position shown in this figure. As above pointed out the plunger 96 in this position connects the pressure pipe 52 with the pump control pipes 51 and 48 and with the pipe 85, leading to valve 53, so that the valve element 59 is shifted into position of Figure 5, and the pump delivers liquid at a high rate through pipes 46 and 54 into the right end of cylinder 30. This causes the piston 29 and table 20 to travel rapidly toward the left. During this movement of the table liquid discharged from the left end of cylinder 30 returns to the pump through pipes 55 and 47.

After swinging the handle 116, the same is released by the operator and the forward edge 132 of the cam plate 127 supports the pin 126 against the retracting pressure of spring 125 as the plate advances toward the left with the table 20. The table and cam plate then continue to advance, with the pin 126 riding against the edge 132, until point x on the work is positioned immediately below the cutter 13, at which point the pin 126 drops into the notch 133. This lateral movement of the pin 126 into notch 133 is transmitted to the rod 106, to shift the same toward the left into the positions of Figure 16, thereby swinging the lever 105, and shifting the plunger 96 into the position shown in this figure. During this movement the lower end of floating lever 105 is compelled to act as a fulcrum by the engagement of pin 146 on the rod 109 against notch 144 in dog 145. When the pilot valve plunger 96 reaches the position shown in Fig. 16, pipe 48 is opened to the drain and thereby permits the rotary valve 325 to assume the position shown in Fig. 28 so that only the pump 306 delivers liquid into the pipe 46, pipe 85 is blocked and pipe 86 is opened to the gear pump to cause the element 59 of valve 53 to assume the position shown in Fig. 6 and close communication between pipes 46 and 54 to thereby bring the table 20 to rest and to open communication between pipes 46 and 56 to thereby direct liquid to the cylinder 27, and pipe 51 remains open to the gear pump to keep the pump 306 at long stroke and thereby cause the pump unit to deliver liquid at a moderate rate to the lower end of the vertical cylinder 27.

The liquid thus delivered to the lower end of cylinder 27 throws the indexing pin 172 into engagement with the bar 173, and then shifts the plunger 76 into the position of Figure 6, as above described, to accurately position and securely lock the table 20 against longitudinal movement. The liquid thus delivered to the vertical cylinder also causes the piston 28 to rise and the knee 16, saddle 18 and table 20 travel upwardly at a moderate rate, until the pin 164 strikes the inclined shoulder 170 on the vertical cam plate 165 and is shifted laterally into the groove 166 therein.

This lateral movement of pin 164 is transmitted through the arm 163, shaft 161, and lever 159 to the rod 109, and shifts this rod toward the right into the position of Figure 17. The rod 106 remains fixed so that the lever 105 is thus swung counter-clockwise about its center, and shifts the plunger 96 further toward the left into the position shown in this figure. In this position of plunger 96 pressure is destroyed in pipe 51 and established in pipe 50, so that the rate of flow of liquid through pipes 46 and 56 is reduced, and the table continues to rise toward the cutter at a reduced rate, appropriate for a cutting feed. The table continues to rise at this reduced rate until the desired depth of cut has been attained, the upward movement of the table being limited by a positive stop in the form of a screw 196, adjustably mounted in an appropriate bracket 197, adjustably fixed to the upright frame 10 of the machine. (See Fig. 2). The screw 196 is disposed within the vertical path of movement of a pin 198, carried by the knee 16. The engagement of pin 198 against the end of screw 196 positively arrests the knee 16 against further upward movement.

During the upward movement of the table the pin 164 travels upwardly along the groove 166 (Fig. 13), forces the gate 171 into retracted position, and enters the diagonal groove 167. The pin is shifted by the groove 167 toward the right past the gate 171, and the gate snaps back into the position shown in Figure 13, and prevents re-entry of the pin 164 into the vertical groove 166. This lateral movement of pin 164 is transmitted to and through rod 109, so that the lever 105 is again swung about its center and the plunger 96 shifted into the dotted line position of Figure 18. In this position of plunger 96, the pressure is maintained in pipe 50, while pipe 85 is again exposed to the pressure in pipe 52 and the pipe 86 is blocked to cause the valve element 59 of valve 53 to be returned to the position of Figure 5. The actual shifting of valve element 59 occupies an appreciable, though brief, time interval, subsequent to the shifting of plunger 96. During this interval the pin 198 stalls against the stop screw 196, the cam plate 165 being so adjusted on the frame 10 of the machine as to complete the shifting of the plunger 96, immediately prior to the engagement of this pin and screw. Then when the valve element reaches the position of Figure 5, pipe 56 is opened to drain pipe 68 and the piston 28 lowers rapidly, under the pressure in pipe 193.

In order to guard against excessive pressures when the upward feed is arrested by the engagement of pin 198 against screw 196, a high pressure relief valve 199 of appropriate form may be connected at any suitable point in the system. In this instance the relief valve 199 is shown connected to pipe 46 and arranged to discharge into pipe 47.

As the piston 27 and table 20 start down the pin 164 is forced further toward the right into the groove 169, this movement being transmitted through rod 109, so as to shift the plunger 96 into the neutral full line position of Figure 18. Pump displacement is thereby reduced to zero and the flow of liquid in pipe 46 ceases. Thereafter the pin 164 follows the groove 169, until it passes out of the lower end thereof. When the pin 164 clears the groove 169, the spring 140 forces the rod 109, and lever 159, into the extreme left position of Figure 19, the pin 164 being swung into the dotted position shown at the extreme left in Figure 13. This causes the lever 105 to swing clockwise about its center, and the plunger 96 is shifted thereby into the right extreme of Figure 19, which corresponds to the position shown in Figure 15. Pipes 48 and 51 are thus again exposed to the pressure in pipe 52 and the pump again delivers liquid at a rapid rate through pipes 46 and 54 into the right end of the cylinder 30, so that the table begins a second rapid lengthwise movement toward the left.

Just before the pin 164 has been released from the lower end of groove 169, however, the piston 28, in its downward travel, engages the plunger 186 and depresses the same, so as to open pipes 179 and 194 to the cylinder 27, to thereby release the pressure therein. The indexing pin 172 is thus retracted from the bar 173, and the plunger 76 is thus returned to the position of Figure 5, and the table 20 is free to renew its lengthwise travel just mentioned.

Upon renewed movement of the table 20, with its horizontal cam plate 127, the pin 126 is forced laterally out of the notch 33, and again follows the forward edge 132 of the cam plate. This lateral movement of the pin 126 is transmitted to the rod 106 to shift the same toward the right from the position of Figure 19 to that of Figure 15, the plunger 96 retaining the same position, and the lever 105 rocking counter-clockwise about its upper end and returning the rod 109 to the position of Figure 15.

It will be noted that as the rod 109 is shifted toward the right from the position shown in Figure 16 to that of Figure 18, the dog 141 is swung upwardly by the engagement of the pin 146, on rod 109, against the tail 145 on the dog. As above pointed out the dog is yieldably retained in this elevated position by the engagement of a spring loaded ball 156 within a socket 157 in the face of the saddle 18. In this elevated position of the dog the rod 109 and pin 146 are permitted to assume the extreme left position of Figure 19. Upon movement of the table 20 toward the left, the frictional contact between the forward edge 155 of the bracket 128, carried thereby, and the plunger 154, carried by the upper arm 153 of the kicker lever 152, urges the lever 152 to swing in a counter-clockwise direction, so the lower arm 148 of the lever presses toward the right against the nose 147 of the dog 141. As soon, therefore, as the rod 109 is shifted from the position of Figure 19 into that of Figure 15, the kicker lever 152 returns the dog 141 into the lower position of the figure, so that rod 109 is again locked against movement toward the left.

The table 20 and cam plate 127 continue movement at a rapid rate toward the left, with the pin 126 following the forward edge 132 of the plate, until point y of the work arrives beneath the cutter 13, at which point the pin 126 shifts into the notch 134 of the cam plate. The cycle of operations, set into motion by the entry of pin 126 in notch 133, is then repeated, lengthwise movement of the table being interrupted while it is being raised and lowered toward and from the cutter, under the control of the vertical cam 165. Upon renewed lengthwise movement of the table the pin 126 again follows the edge 132 of the horizontal cam plate until point z on the work arrives beneath the cutter, at which point the pin 126 shifts into the notch 135. At this point lengthwise movement of the table is again interrupted and the vertical feed cycle again repeated. Upon renewed lengthwise movement of the table the pin 126 lifts out of the notch 135 and then passes laterally through the cut away portion 136 to the groove 129. This lateral movement of the pin 126 is transmitted through the rod 106 and lever 105 so as to shift the plunger 96 from the full line position of Figure 15 into the dotted line position of the same figure. In this dotted line position of the plunger, reduced portion 100 thereof is open to groove 90 and the reduced portion 99 is open to groove 89, so that the control pipe 49 of the pump is exposed to the pressure in pipe 52 and the pump is so adjusted as to deliver liquid at a high rate through pipes 47 and 55 into the left end of the cylinder 30. This causes the piston 29 and table 20 to travel at a rapid rate toward the right. This movement of the table continues, with the pin 126 following the groove 129 in the cam plate 127, until the table approaches the initial position of Figure 4, at which time the pin 126 forces the gate 137 into retracted position and enters the diagonal groove 130. In following the diagonal groove 130 the pin 126 is again shifted laterally causing the rod 106, lever 105, and plunger 96 to return to the neutral position of Figure 14. This reduces the displacement of the pump to zero, the flow of liquid in pipes 46 and 47 ceases, and the table comes to rest. The pin 126 finally comes to rest in the full line position of Figure 12, in which position it has cleared the gate 137, and the gate has returned into the full line position shown.

It will be noted that, in the machine described, the pump is placed under the control of pipes 48 and 49 only for effecting rapid lengthwise movement of the table, and that pipes 50 and 51 come into play only to effect vertical movement of the table toward the cutter. Provision is made in the machine shown for rendering the pipes 50 and 51 ineffective, when the cutter 13 is out of operation, to thereby prevent vertical movement of the table under that condition, but to permit lengthwise travel of the table irrespective of the condition of the cutter. The operation of the cutter 13 is controlled by the usual clutch 200, which in turn is controlled by the hand lever 201, (Fig. 4) ordinarily mounted at the side of the upright frame 10 of the machine. The lever shown is connected to the clutch 200, through a link 202, and lever 203, pivoted at 204, so that movement of the lever 201 toward the right closes the clutch and movement toward the left opens the clutch. The lever 201 is provided with an arm 205, connected to a piston valve 206 fitted in a valve casing 207. Three grooves 208, 209 and 210 in the casing are connected through pipes 211, 212, and 213, respectively, with pipes 50, 51, and drain pipe 98. The piston valve is provided with a reduced portion 214 through which all three pipes 211, 212, and 213 communicate when the valve is in its lower position. When the valve is raised to its upper position as shown in Fig. 4, it covers the grooves 208 and 209, so that the pipes 211 and 212 no longer communicate with each other or with the drain pipe. The arrangement is such that when the lever 201 is shifted to open the clutch, to thereby throw the cutter 13 out of operation, both pipes 50 and 51 are opened to the drain pipe 98 through pipes 211, 212, and 213, and no pressure can be established therein. When the clutch is closed by swinging the lever 201 toward the right, this action of the lever raises the valve 206 which blocks pipes 211 and 212 and pipes 211 and 212 are both closed, and pressure may then be established in pipes 50 or 51.

It will thus be noted that a rather elaborate hydraulic system has been provided capable of effecting rapid lengthwise travel of a milling machine table from one predetermined point to another, of effecting a vertical feed and return of the table at each point, of effecting a lengthwise return movement of the table to a starting position, and finally bringing the table to rest, all under the automatic control of the pilot valve 87. The machine shown has also been provided with means including the locking plate 93' for retaining the plunger of valve 53 in the position of Fig. 5, when vertical movement of the table is not required, and with such arrangement the lever 159 and rod 109 remain fixed and the pilot valve 87 then responds only to the action of the rod 106 which is controlled by the cam plate 127 of appropriate form attached to the table.

Figure 23 illustrates another typical operation which may be performed to advantage in a milling machine equipped with a drive mechanism designed in accordance with the present invention. Several pieces of work $w$ are shown fixed to the table 20. Each piece is of hollow form and it is desired to drill the base $k$ thereof and to spot face the interior bottom face $m$, thereof in such manner that the finished face $m'$ shall be accurately positioned with respect to the top of the rim $r$. To accomplish this a drill 220 and facing cutter 221 are provided, supported by and driven through a special fitting 222 of a well known type, attached to the frame 10 of the machine.

The operation of the machine is substantially the same as hereinabove described, the vertical and horizontal cam plates having been replaced, however, by cam plates 165' and 127', respectively, especially designed for this particular operation. The stop screw 196 has also been adjusted so as to stop the upward movement of the table at a definite point, which accurately determines the position of the finished face $m'$, and the vertical cam plate 165' has been adjusted accordingly, so as to insure the shifting of plunger 96 immediately prior to the engagement of pin 198 against the stop screw. The horizontal cam plate 127' is shown provided with several notches 133', corresponding in number to the number of work pieces. These notches function in a manner similar to the notches 133, 134, and 135, each operating the pin 126 so as to interrupt the longitudinal movement of the table 20, as a work piece arrives beneath the drill 220. Each time the table starts to rise the indexing pin 175 is thrust into engagement between the teeth 175' of the bar 173, in the manner hereinabove explained, so that each work piece is accurately aligned with the drill.

While held against lengthwise movement by the indexing pin, the table continues to rise lifting the work into contact with the drill and continuing the upward feed movement at a moderate rate until the cutter 221 approaches the face $m$. The pin 164 is then shifted laterally by the shoulder 170', and the rate of feed is reduced to that appropriate for the cutter 221. The vertical feed continues until the pin 198 stalls against the screw 196. The table then lowers again into its original plane, the indexing pin is withdrawn and lengthwise movement of the table renewed in the manner hereinabove explained. This vertical movement is sufficient to permit the rim of each work piece to clear the drill during lengthwise movement of the table.

Various changes may be made in the embodiment of the invention hereinabove specifically described without departing from or sacrificing any of the advantages of the invention as defined in the appended claims.

We claim:—

1. In a milling machine the combination of a vertically movable support, a lengthwise movable table on said support, hydraulically actuated means for moving said support to raise and lower said table, hydraulically actuated means connected with said support for effecting lengthwise movement of said table thereon, pump mechanism for discharging liquid at a measured rate and means for directing the liquid discharged from said pump mechanism to either of said hydraulically actuated means to control the rate and direction of movement of said table.

2. In a milling machine the combination of a vertically movable support, a lengthwise movable table on said support, hydraulically actuated means for moving said support to raise and lower said table, hydraulically actuated means for effecting lengthwise movement of said table, a pump mechanism, and means for connecting said pump mechanism with either of said hydraulically actuated means and for controlling the rate and direction of liquid discharged by said pump mechanism to regulate and control the operation of said table.

3. In a milling machine the combination of a vertically movable support, a lengthwise movable table thereon, a pump mechanism capable of discharging liquid at controlled variable rates, means actuated by liquid discharged by said pump mechanism for moving said table in either direction, means actuated by liquid discharged by said pump mechanism for moving said support to raise and lower said table, and means for controlling the operation of both of said means to thereby control the rate and direction of movement of said table.

4. In a milling machine the combination of a vertically movable support, a lengthwise movable table thereon, a pump mechanism capable of discharging liquid at controlled variable rates, means actuated by liquid discharged from said pump mechanism for moving said table in either direction, a second means actuated by liquid discharged from said pump mechanism for moving said support to raise and lower said table, means controlled by lengthwise movement of said table for initiating the operation of said second named means, and means controlled by movement of said support for initiating the operation of said first means.

5. In a milling machine the combination of a vertically movable support, a lengthwise movable table thereon, hydraulically actuated means controlled by movement of said table for moving said table in either direction, hydraulically actuated means controlled by movement of said support for moving said support to thereby raise and lower said table, and a pump mechanism for delivering liquid to both of said hydraulically actuated means.

6. In a milling machine the combination of a vertically movable support, a lengthwise movable table thereon, hydraulically actuated means for moving said table, control mechanism for said means automatically operable to effect an intermittent advance of said table, a second hydraulically actuated means for moving said support, and control mechanism for said second hydraulically actuated means cooperating with said first named control mechanism for automatically effecting movement of said support to raise and lower said table between successive advance movements thereof.

7. In a milling machine the combination of a vertically movable support, a lengthwise movable table thereon, hydraulically actuated means for moving said table, hydraulically actuated means for moving said support to raise and lower said table, and control mechanism for both of said means automatically operable to effect an intermittent advance of said table and a raising and lowering of said table in definite sequence.

8. In a milling machine the combination of a vertically movable support, a lengthwise movable table thereon, hydraulically actuated means for effecting a rapid movement of said table between a succession of predetermined positions, hydraulically actuated means for moving said support to raise and lower said table at each of said positions, and control mechanism for effecting the automatic operation of each of said hydraulically actuated means.

9. In a milling machine the combination of a tool, a vertically movable support, a lengthwise movable table thereon, means for effecting a rapid movement of said table between a succession of predetermined positions beneath said tool, means for moving said support to raise and lower said table toward and from said tool at each of said positions, and control mechanism for effecting the automatic operation of each of said means in definite sequence.

10. In a milling machine the combination of a tool, a vertically movable support, a lengthwise movable table thereon, means for effecting a rapid movement of said table between a succession of predetermined positions beneath said tool, means for moving said support at regulated speeds to raise and lower said table toward and from said tool at each of said positions, and control mechanism for effecting the automatic operation of each of said means in definite sequence.

11. In a milling machine the combination of a tool, a vertically movable support, a lengthwise movable table thereon, means for effecting a rapid movement of said table between successive predetermined positions beneath said tool, means for moving said support at regulated speeds to raise and lower said table toward and from said tool, means for regulating the rate of movement of said support, and control mechanism automatically operable to effect the movements of said table and support in definite sequence.

12. In a milling machine the combination of a vertically movable support, a lengthwise movable table thereon, means for moving said table between successive predetermined positions, means for holding said table against longitudinal movement in each position, means for moving said support to raise and lower said table while so held, and control mechanism for effecting the automatic operation of said several means in definite sequence.

13. In a milling machine the combination of a vertically movable support, a lengthwise movable table thereon, means for moving said table between successive predetermined positions, means for holding said table against longitudinal movement in each position, means for moving said support to raise and lower said table while so held, and means controlled by movement of said support for controlling said holding means.

14. In a machine tool or the like the combination of a movable support, a movable table thereon, means for moving said table between a succession of predetermined positions, means for holding said table against such movement in each position, means for moving said support to shift said table while so held, and means controlled by movement of said support for controlling said holding means.

15. In a machine tool or the like the combination of a movable support, a movable table thereon, means for moving said table between successive predetermined positions, means for holding said table against such movement in each position, means for moving said support to shift said table while so held, and control mechanism for effecting the automatic operation of said several means in predetermined sequence.

16. In a machine tool or the like the combination of a movable support, a member movable thereon, means for moving said member successively between a series of predetermined positions on said support, means for holding said member against movement in each position, means for moving said support to shift said member while so held, and control mechanism for effecting the automatic operation of said several means in predetermined sequence.

17. In a machine tool or the like the combination of a movable support, a member movable thereon, hydraulically actuated means for moving said member between a series of predetermined positions, hydraulically actuated means for holding said member against such movement in each of said positions, hydraulically actuated means for moving said support to shift said member while so held, and control mechanism for effecting the automatic operation of said several means in definite sequence.

18. In a machine tool or the like the combination of a movable support, a movable member thereon, hydraulically actuated means for moving said member between a series of predetermined positions, hydraulically actuated means for holding said member against such movement, hydraulically actuated means for moving said support to shift said member while so held, and means controlled by movement of said support for controlling said holding means.

19. In a machine tool or the like the combination of a member, hydraulic means for effecting an intermittent advance of said member, a second hydraulic means for shifting said member between successive advance movements thereof, means controlled by the advance of said member for rendering said second hydraulic means active, and means controlled by the shifting of said member for rendering said first named hydraulic means active.

20. In a machine tool or the like the combination of a member, hydraulic means for advancing said member intermittently, means for intermittently holding said member against such advance, hydraulic means for shifting said member while so held, means controlled by the shifting of said member for releasing said holding means and for rendering said advancing means active, and means controlled by the advance of said member for rendering said holding means and said shifting means active.

21. In a machine tool or the like the combination of a driven member, means for intermittently advancing said member, means for intermittently holding said member against such advance, means for shifting said member while so held, means controlled by the shifting movement of said member for controlling said holding means, means controlled by the shifting movement of said member for rendering said advancing means active, and means controlled by the advance movement of said member for rendering said shifting means active.

22. In a machine tool or the like the combination of a tool support, a work support, hydraulically actuated means automatically operable to effect a relative step by step advance movement between said supports, hydraulically actuated means for automatically shifting one of said supports toward and from the other between successive advance movements, and control mechanism automatically operable to effect the operation of both of said hydraulically actuated means in definite sequence.

23. In a machine tool or the like the combination of a tool support, a work support, hydraulic means for effecting a relative advance movement between said supports, control mechanism automatically operable to interrupt said advance at predetermined points, hydraulic means controlled by said mechanism for reciprocating one of said supports relative to the other at each of said points, and means cooperating with said control mechanism to automatically renew the action of said advancing means after each operation of said reciprocating means.

24. In a machine tool or the like the combination of a tool support, a work support, hydraulic means for effecting a relative advance movement between said supports, hydraulic means for reciprocating one of said supports relative to the other, valve mechanism for controlling the operation of said hydraulic means, and means responsive to both the advance movement and the reciprocating movement for controlling said valve mechanism.

25. In a machine tool or the like the combination of a tool support, a work support, hydraulic means for effecting relative advance movement between said supports and for reciprocating one of said supports relative to the other, control mechanism responsive to the advance movement between said supports, control mechanism responsive to the reciprocation of said support, and means under the joint control of said control mechanisms for controlling said hydraulic means.

26. In a hydraulic transmission for machine tools and the like the combination of two hydraulic motors, a variable displacement pump for delivering a driving liquid to either of said motors at variable rates, valve mechanism controlling communication between said pump and said motors, and valve mechanism for controlling said first named valve mechanism and for regulating the rate of liquid discharged by said pump.

27. In a hydraulic transmission for machine tools and the like the combination of a plurality of hydraulic motors, a variable displacement pump for delivering a driving liquid to said motors at a variable rate, valve mechanism for controlling communication between said motors and said pump, and unitary means for controlling said valve mechanism and for regulating the rate of liquid discharged by said pump.

28. In a hydraulic transmission the combination of a plurality of hydraulic motors, a variable displacement pump for delivering a driving liquid to said motors at a variable rate, valve mechanism for controlling communication between said motors and said pump, unitary means for controlling said valve mechanism and for regulating the rate of liquid discharged by said pump, and means responsive to the action of each of said motors for controlling said unitary means.

29. In a machine tool or the like the combination of a driven member, hydraulic means for driving said member in different directions, and control mechanism for said hydraulic means, said control mechanism including a floating lever, means responsive to movement of said member in one direction for operating said lever, and separate means responsive to movement of said control mechanism in another direction for operating said lever.

30. In a machine tool or the like the combination of a driven member, hydraulic means for driving said member in different directions, means including a lever for controlling said hydraulic means, a fulcrum for said lever, means for releasably holding said fulcrum against movement, means responsive to movement of said member in one direction for rocking said lever about said fulcrum, and means responsive to movement of said member in another direction for shifting said fulcrum.

31. In a hydraulic transmission for machine tools and the like the combination of two hydraulic motors, means including a floating lever for controlling said motors, a fulcrum for said lever, means for releasably holding said fulcrum against movement, means responsive to the action of one of said motors for rocking said lever about said fulcrum, and means responsive to the action of the other of said motors for shifting said fulcrum.

32. In a hydraulic transmission for machine tools and the like the combination of two hydraulic motors, means including a floating lever for controlling said motors, a fulcrum for said lever, a latch for holding said fulcrum against movement in one direction, means responsive to the action of one of said motors for rocking said lever about said fulcrum, means responsive to the action of the other of said motors for shifting said fulcrum in the opposite direction, means responsive to the shifting of said fulcrum for releasing said latch and means responsive to the action of said first named motor for re-setting said latch.

33. The combination of a driven member, a plurality of hydraulic motors for driving said member in different directions, a pump mechanism, valve mechanism adjustable to connect said pump in driving relation with either of said motors, means normally operable to by-pass one of said motors when the other is connected in driving relation with said pump mechanism, and means for blocking said by-pass means.

34. The combination of a driven member, a plurality of hydraulic motors for driving said member in different directions, a pump mechanism, means adjustable to connect said pump mechanism in driving relation with either of said motors, means normally operable to by-pass one of said motors when the other is connected in driving relation with said pump mechanism, an indexing pin operable to accurately position said driven member, means for blocking said by-pass means, and means for operating said indexing pin and said blocking means.

35. The combination of a driven member, a plurality of hydraulic motors for driving said member in different directions, a pump mechanism, means automatically operable to connect said pump mechanism in driving relation with said motors successively, means for holding said member against movement in one direction when operated by one of said motors, and means for accurately limiting the movement of said member under the action of said active motor.

36. The combination of a driven member, a plurality of hydraulic motors for operating said member in different directions, a positive stop for accurately limiting the movement of said member in one direction under the action of one of said motors, means for automatically interrupting and renewing the action of the other of said motors to effect an intermittent movement of said member in another direction, and means for holding said member against movement by said last mentioned motor while said first mentioned motor is active.

37. The combination of a driven support, means for driving said support in one direction between a succession of predetermined points, means for accurately locating said support at each point, means for driving said support in another direction, and means for accurately determining the extent of movement of said support in said other direction.

38. In a machine tool or the like the combination of a work table, a support therefor hydraulically actuated, means for driving said table relative to said support, and a manually operated driving connection between said table and support for driving said table in the same direction, said connection including a non-locking screw permitting free movement of said table under the action of said means.

39. In a machine tool or the like the combination of tool driving means, control means therefor, a work table, hydraulic means for driving said table, control means for said table driving means, and means responsive to said first named control means for modifying said last named control means.

40. A material working machine including a plurality of carriages, a fluid operated actuating mechanism associated with each carriage, a fluid control mechanism for governing the actuation of said carriage operating mechanisms, said control mechanism including a main valve having a plurality of fluid directing passages and a casing in which said valve is movable having a plurality of fluid ports, a distributor valve unit, means for supplying fluid to said main valve, fluid conducting means connecting said main valve with the distributor valve unit, fluid conducting means connecting said distributor valve unit with the carriage operating mechanisms, and means for controlling the actuation of said main valve and said distributor valve unit.

WALTER FERRIS.
JOHN P. FERRIS.
WALTER MICKELSON.